(12) United States Patent
Kuriyama

(10) Patent No.: US 8,416,310 B2
(45) Date of Patent: Apr. 9, 2013

(54) IMAGING DEVICE AND IMAGING PROCESSING APPARATUS CAPABLE OF RECORDING AND GENERATING MOVIE IMAGE DATA

(75) Inventor: Takashi Kuriyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 301 days.

(21) Appl. No.: 12/896,066

(22) Filed: Oct. 1, 2010

(65) Prior Publication Data

US 2011/0221916 A1    Sep. 15, 2011

(30) Foreign Application Priority Data

Oct. 14, 2009  (JP) ................................ 2009-237069
Sep. 14, 2010  (JP) ................................ 2010-205172

(51) Int. Cl.
*H04N 5/225*  (2006.01)
*H04N 5/77*   (2006.01)

(52) U.S. Cl.
USPC ................. 348/220.1; 348/222.1; 348/231.4; 348/333.02; 386/225; 386/230

(58) Field of Classification Search ............... 348/220.1; 386/225
See application file for complete search history.

(56) References Cited

U.S. PATENT DOCUMENTS

| 7,847,828 B2 * | 12/2010 | Kita et al. ................. 348/220.1 |
| 7,855,733 B2 * | 12/2010 | Hamamura et al. ........ 348/220.1 |
| 8,289,411 B2 * | 10/2012 | Nitta .......................... 348/220.1 |
| 2006/0119711 A1 | 6/2006 | Ejima et al. |
| 2008/0273094 A1 * | 11/2008 | Kunieda ..................... 348/220.1 |
| 2009/0309989 A1 * | 12/2009 | Tanaka et al. .............. 348/220.1 |
| 2011/0025865 A1 * | 2/2011 | Kunishige et al. ......... 348/220.1 |
| 2011/0063463 A1 | 3/2011 | Ejima et al. |
| 2011/0211086 A1 * | 9/2011 | Mizuno et al. ............. 348/220.1 |

FOREIGN PATENT DOCUMENTS

| JP | A 2006-165769 | 6/2006 |
| JP | A-2006-165770 | 6/2006 |
| JP | A-2009-060355 | 3/2009 |

OTHER PUBLICATIONS

Jan. 10, 2012 Notification of Reason(s) for Refusal issued in Japanese Patent Application No. 2010-205172 (with translation).

* cited by examiner

*Primary Examiner* — Ngoc-Yen Vu
(74) *Attorney, Agent, or Firm* — Oliff & Berridge, PLC

(57) ABSTRACT

Provided are: an imaging sensor that captures light from a subject; a first instruction unit that instructs to capture a still image by using the imaging sensor; a recording control unit that records a single movie image file containing a first movie image produced based upon an imaging signal output from the imaging sensor during a period from when the still image is captured by the capturing instruction by the first instruction unit until before a first predetermined time and a second movie image produced by using the still image during a period from when the still image is captured until after a second predetermined time, or recording a single movie image file containing the second movie image and a third movie image produced based upon the imaging signal output from the imaging sensor during a period from when the still image is captured until after a third predetermined time, in a recording unit; and a detection unit that detects movement information of the subject, and the recording control unit sets at least one length of the first predetermined time, the second predetermined time, and the third predetermined time, based upon the movement information detected by the detection unit.

15 Claims, 18 Drawing Sheets

IMAGING DEVICE AND IMAGING PROCESSING APPARATUS CAPABLE OF RECORDING AND GENERATING MOVIE IMAGE DATA

CROSS-REFERENCES TO RELATED APPLICATIONS

The disclosures of the following priority applications are herein incorporated by reference:

Japanese Patent Application No. 2009-237069, filed on Oct. 14, 2009; and

Japanese Patent Application No. 2010-205172, filed on Sep. 14, 2010.

TECHNICAL FIELD

The present invention relates to an imaging device capable of recording a movie image and to an image processing device capable of generating a movie image.

BACKGROUND ART

There has been proposed a digital camera for creating movie image data based upon a movie image shot by a digital camera, and frozen movie image data in which based upon a still image shot by the digital camera after shooting the movie image, the still image is reproduced for a predetermined period so as to produce a movie image file by linking to edit the frozen movie image data in continuation with the last frame of the movie image data (for example, see Patent Literature 1).

CITATION LIST

Patent Literature

{PTL 1} Japanese Patent Laid-open Publication (A) No. 2006-165769

SUMMARY OF INVENTION

Technical Problem

However, in the above-described conventional technology, the length of the recording time of the movie image and the length of the reproducing time of the frozen movie image based upon the still image cannot be freely set in accordance with the movement of a subject or the like, for example.

Therefore, when shooting a movie image, it is desired a technology that allows for acquisition of a movie image having an impressive video effect such as a movie image created by combining a still image and a movie image of a subject having movement without performing synthesis processing in an image processing device or the like. However, a high level of operational skill is required when a user attempts to shoot a movie image having an impressive video effect such as described above by way of manually operating a video camera or the like.

An object of the present invention is to provide an imaging device and an image processing device capable of easily creating movie image data including a movie image having an impressive video effect.

Solution to Problem

An imaging device of the present invention comprises: an imaging sensor that captures light from a subject; a first instruction unit that instructs to capture a still image by using the imaging sensor; a recording control unit that records a single movie image file containing a first movie image produced based upon an imaging signal output from the imaging sensor during a period from when the still image is captured by the capturing instruction by the first instruction unit until before a first predetermined time and a second movie image produced by using the still image during a period from when the still image is captured until after a second predetermined time, or recording a single movie image file containing the second movie image and a third movie image produced based upon the imaging signal output from the imaging sensor during a period from when the still image is captured until after a third predetermined time on a recording medium; and a detection unit that detects movement information of the subject, wherein the recording control unit sets at least one length of the first predetermined time, the second predetermined time, and the third predetermined time, based upon the movement information detected by the detection unit.

Moreover, an image processing device of the present invention comprises: a first selection unit that selects predetermined frame images from among a plurality of frame images forming a predetermined movie image file recorded on the recording medium; a display control unit that controls a display of a movie image formed by a first movie image produced by using the frame images recorded during a first predetermined time before a recording time of the predetermined frame images selected by the first selection unit and a second movie image produced by using the predetermined frame images in a length of a second predetermined time, or a movie image formed by the second movie image and a third movie image produced by using the frame images recorded during a third predetermined time after the recording time of the predetermined frame images, on the display unit; and a detection unit that detects movement information of a subject in the plurality of frame images, wherein the display control unit sets at least one length of the first predetermined time, the second predetermined time, and the third predetermined time, based upon the movement information detected by the detection unit.

Advantageous Effects of Invention

According to the imaging device and the image processing device of the present invention, it is possible to easily create movie image data including a movie image having an impressive video effect.

DESCRIPTION OF EMBODIMENTS

Figure 1:
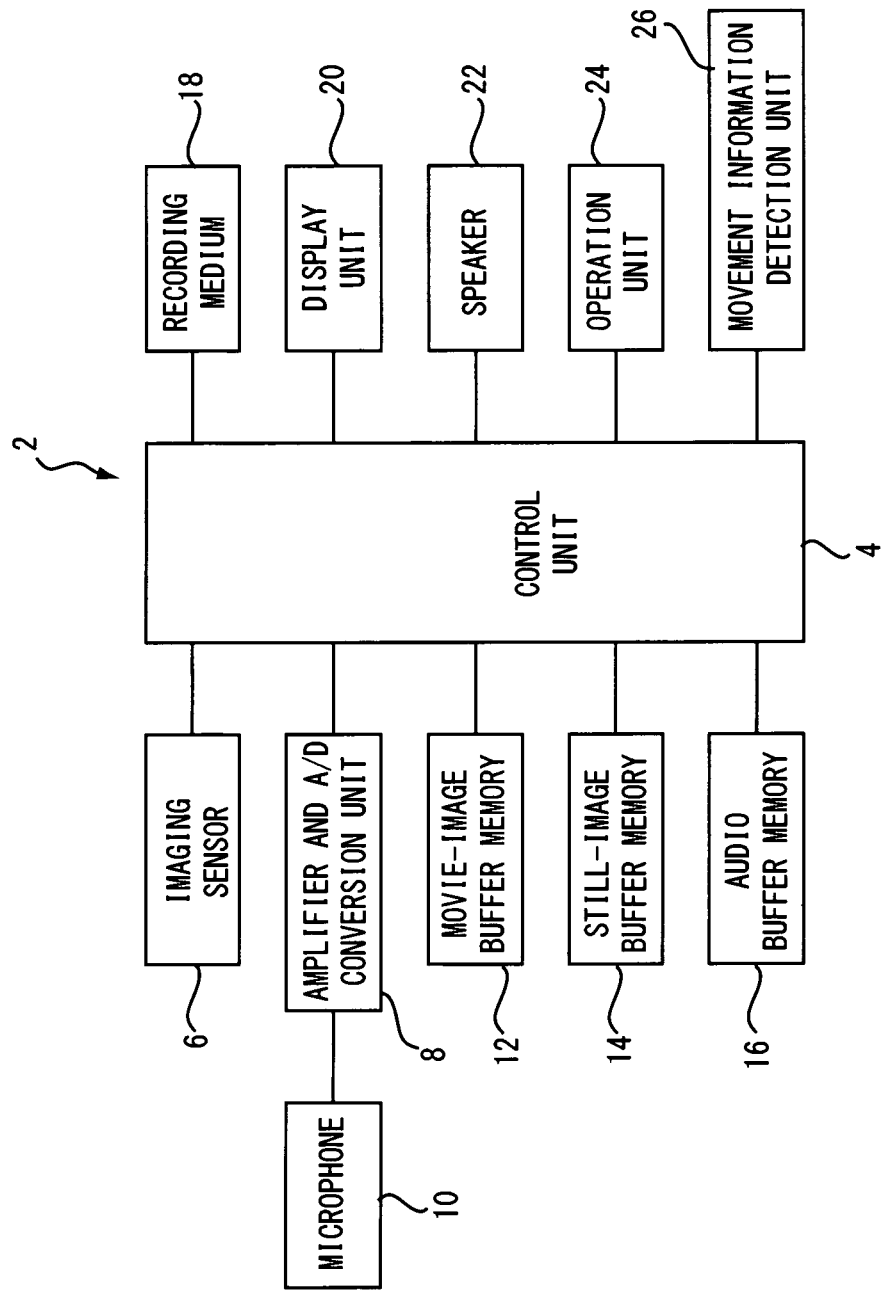
FIG. 1 is a block diagram showing the system configuration of an electronic camera according to an embodiment.

Hereinafter, with reference to the drawings, an electronic camera will be described as an imaging device according to a first embodiment of the present invention. FIG. 1 is a block diagram showing the system configuration of an electronic camera 2 according to the first embodiment. As shown in FIG. 1, the electronic camera 2 includes a control unit 4, which is constituted with a microprocessor or the like, for performing unified control of the various parts of the electronic camera 2. The control unit 4 is connected to the imaging sensor 6, an amplifier and A/D conversion unit 8, a movie-image buffer memory 12, a still-image buffer memory 14, an audio buffer memory 16, a recording medium 18, a display unit 20, a speaker 22, an operation unit 24, and a movement detection unit 26.

The imaging sensor 6 is constituted with a CCD, a CMOS or the like and captures subject light obtained via a photographic lens (not shown) so as to output an imaging signal to the control unit 4. The amplifier and A/D conversion unit 8 converts an analog signal of the audio in the vicinity of the electronic camera 2, which is collected by a microphone 10 into a digital signal, and outputs the converted digital audio signal to the control unit 4.

The movie-image buffer memory 12 temporarily stores movie image data created based upon the imaging signal from the imaging sensor 6 and resized (resolution reduced) to a resolution for movie image use, via a compression circuit (not shown) in the control unit 4. The still-image buffer memory 14 temporarily stores still image data created based upon the imaging signal from the imaging sensor 6. The audio buffer memory 16 temporarily stores audio data created based upon the digital audio signal output from the amplifier and A/D conversion unit 8.

The recording medium 18 is a portable recording medium detachably provided in a card slot (not shown) arranged to the electronic camera 2, and for example, uses a CF card, an SD card, a smart media or the like. The recording medium 18 records movie image data, resulting from the movie image data created in the control unit 4 undergoing image processing for a movie image by a movie-image signal processing circuit (not shown) in the control unit 4, and undergoing movie-image compression processing by a movie-image compression circuit (not shown) in the control unit 4. Likewise, the recording medium 18 records still image data, resulting from the still image data created in the control unit 4 undergoing still-image compression processing by a still-image signal processing circuit (not shown) in the control unit 4, as well as audio data created in the control unit 4 and added to the corresponding movie image data, and the like.

The display unit 20 is constituted with a monitor or an EVF, for example, configured by an LCD, for example, provided on the rear surface of the electronic camera 2. The display unit 20 displays a through image based upon the imaging signal from the imaging sensor 6, a still image and a movie image based upon the image data recorded on the recording medium 18, a sample movie image stored in a memory (not shown) in a camera as sample movie image data for each scenario movie image shooting mode which will be described later, information regarding shooting, and the like. The speaker 22 outputs audio based upon the audio data recorded on the recording medium 18, or based upon audio data recorded in a memory (not shown) in association with the sample movie image data stored in the memory (not shown) in the above-described camera.

The operation unit 24 includes a power switch for turning on/off the power of the electronic camera 2, a recording start button (for example, a REC button, a shutter button and the like) operated when starting to record a still image or a movie image and audio, a recording end button (for example, a REC button, a shutter button and the like) operated when completing the recording of the movie image and audio, a menu button for displaying a menu and the like on the display unit 20, a cross key operated at the time of the selection of menu items and the like and at the time of various settings, and an OK button for performing a determination operation for the selection of the menu items and the like and the various settings.

The movement information detection unit 26 detects movement information for a subject having movement, when a movie image is shot by the electronic camera 2. Specifically, based upon at least two frame images created based upon the imaging signal from the imaging sensor 6 and resized (resolution reduced) to a resolution for use in subject movement information detection, via the compression circuit (not shown) in the control unit 4, the movement information detection unit 26 calculates a motion vector by well-known motion vector calculation processing, and based upon the calculated motion vector, detects the movement information of the subject having movement (in this embodiment, a movement velocity of the subject).

The electronic camera 2 according to this embodiment is capable of automatically shooting a movie image produced by combining the movie image and the still image of the subject having movement. Hereafter, with reference to a flowchart shown in FIG. 2, description is given of the processing when shooting the above-described movie image with the electronic camera 2 according to the first embodiment.

Figure 3:
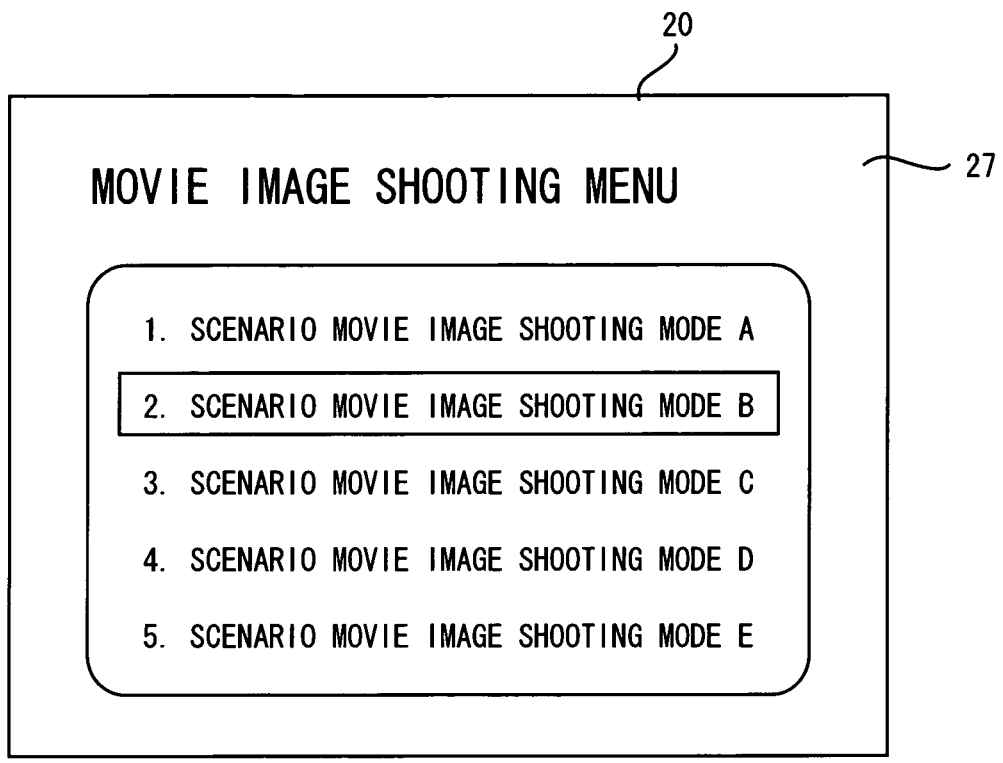
FIG. 3 is a diagram showing a display example of a display unit according to the embodiment.

First, if a user gives an instruction for displaying a movie image shooting menu (e.g., pressing of a menu button), the control unit 4 displays a movie image shooting menu screen 27, for example as shown in FIG. 3, on the display unit 20 (step S10). Items that allow for selecting various movie image shooting modes (in FIG. 3, scenario movie image shooting modes A, B, C, D, and E) are displayed on the movie image shooting menu screen 27. f the user selects one movie image shooting mode (in FIG. 3, the scenario movie image shooting mode B) using the cross key or the like and presses the OK button, the control unit 4 displays a screen 28, for example shown in FIG. 4, on the display unit 20. A message such as "Display sample movie image?" and items serving to select an answer to the message (in FIG. 4, "Yes" and "No") are displayed on the screen 28.

It is to be noted that in this embodiment, the scenario movie image shooting mode B is a mode shooting a movie image in which a still image is displayed as if to start moving or a moving subject is displayed as if to be stationary. Furthermore, the sample movie image is a movie image, which is created in advance for each scenario movie image shooting mode, which serves to accurately present to the user the characteristic video effect for each of these scenario movie image shooting modes, and which is stored in a memory (not shown) in the electronic camera 2; by way of viewing the sample movie image, the user can easily understand the format (mode) of the movie image that can be shot in the selected scenario movie image shooting mode.

Figure 4:
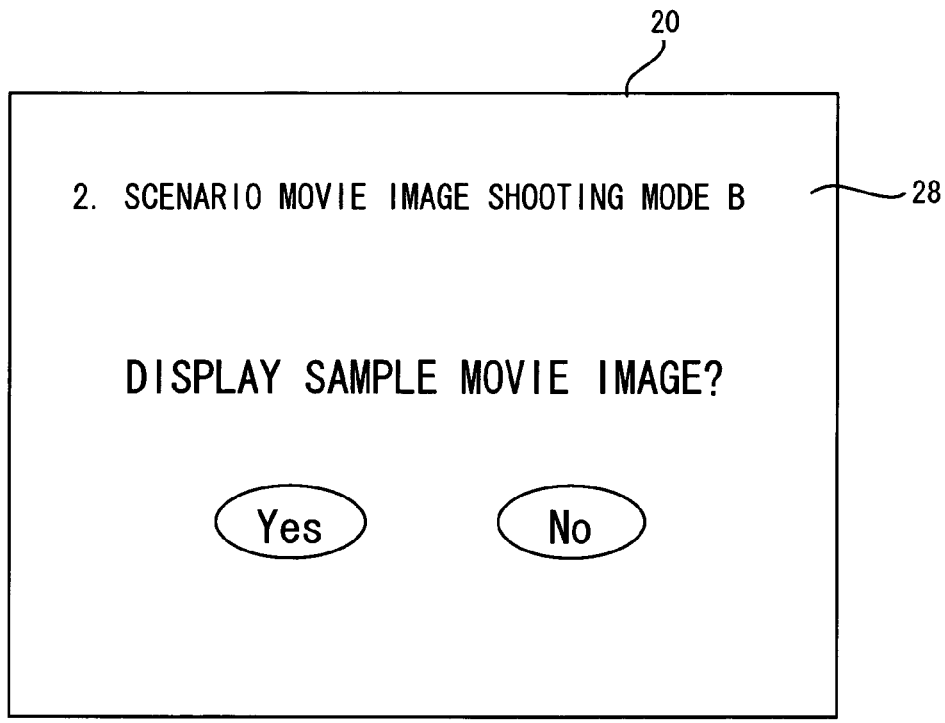
FIG. 4 is a diagram showing a display example of the display unit according to the embodiment.
Figure 5:
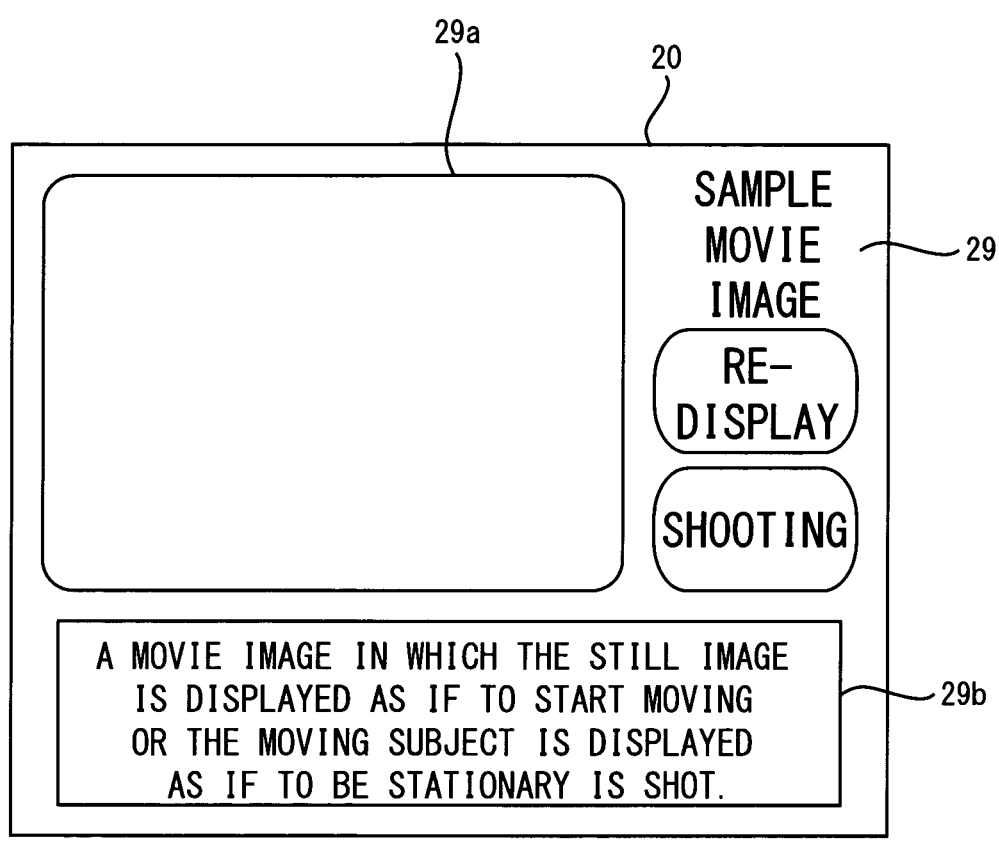
FIG. 5 is a diagram showing a display example of the display unit according to the embodiment.

If the user uses the cross key or the like to select "Yes" and presses the OK button (Yes in step S11), the control unit 4 displays a screen 29 on the display unit 20, for example as shown in FIG. 5, for the purpose of displaying the sample movie image (the display switches from FIG. 4 to FIG. 5). A sample movie image display area 29a for displaying the sample movie image, a message display area 29b in which simple descriptive text (in FIG. 5, "A movie image in which the still image is displayed as if to start moving or the moving subject is displayed as if to be stationary is shot"), is displayed in order to describe the selected scenario movie image shooting mode B and icons for selecting displaying the sample movie image again or moving to movie image shooting (in FIG. 5, "Display Again" and "Shooting") are respectively displayed on the screen 29. Next, the control unit 4 displays a sample movie image in the scenario movie image shooting mode B in the sample movie image display area 29a (step S12).

It is to be noted that the scenario movie image shooting mode includes not only the mode for shooting a movie image in the manner set forth in the descriptive text in FIG. 5, but also movie image shooting modes (other scenario movie image shooting modes A and C through E) in which the movie image is reproduced and displayed according to scenarios different from each other in each mode and which provide various video effects, e.g., a mode for shooting a movie image while successively switching focus among subjects at different shooting distances within the shooting screen and a mode for shooting a movie image while simultaneously changing the focus state and the zoom state.

If the user selects "Display Again," using the cross key or the like, and presses the OK button (Yes in step S13), the control unit 4 once again displays the sample movie image corresponding to the scenario movie image shooting mode B in the sample movie image display area 29a on the screen 29 shown in FIG. 5 (step S12). Meanwhile, if the user selects "No" on the screen 28 shown in FIG. 4 (No in step S11), or if the user selects "Shooting" on the screen 29 shown in FIG. 5 (No in step S13), the control unit 4 moves to a setting for shooting the movie image in the scenario movie image shooting mode B, i.e., a mode in which the still image is displayed as if to start moving or the moving subject is displayed as if to be stationary (step S14).

Figure 6:
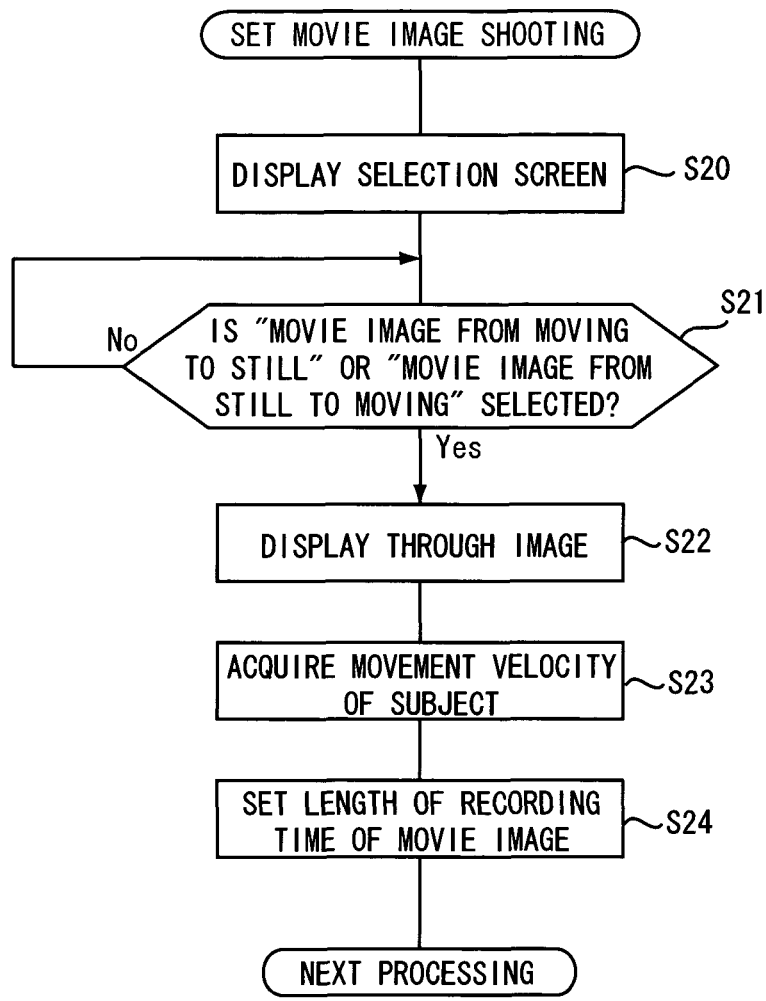
FIG. 6 is a flowchart explaining processing when performing setting to shoot the movie image in the electronic camera according to the embodiment.

FIG. 6 is a flowchart explaining the processing when performing the setting for shooting a movie image in the scenario movie image shooting mode B. It is to be noted that the movie images in the scenario movie image shooting mode B includes: a movie image (hereinafter, referred to as "movie image from moving to still") created by linking a first movie image and a second movie image, in which after a movie image of a moving subject (first movie image) is shot, a still image of the moving subject is shot, and a movie image (second movie image) is produced by using the shot still image; and a movie image (hereinafter, referred to as "movie image from still to moving") created by linking a movie image produced by using a shot still image and a third movie image, in which after a still image of a moving subject is shot, a movie image of the moving subject (third movie image) is shot.

Therefore, firstly, the control unit 4 displays on the display unit 20 a selection screen as a menu for allowing the user to select whether or not to shoot the "movie image from moving to still" or to shoot the "movie image from still to moving" (step S20). When the "movie image from moving to still" or the "movie image from still to moving" is selected by the user and the OK button is pressed (Yes in step S21), the control unit 4 displays a through image on the display surface of the display unit 20 (step S22).

Figure 7:
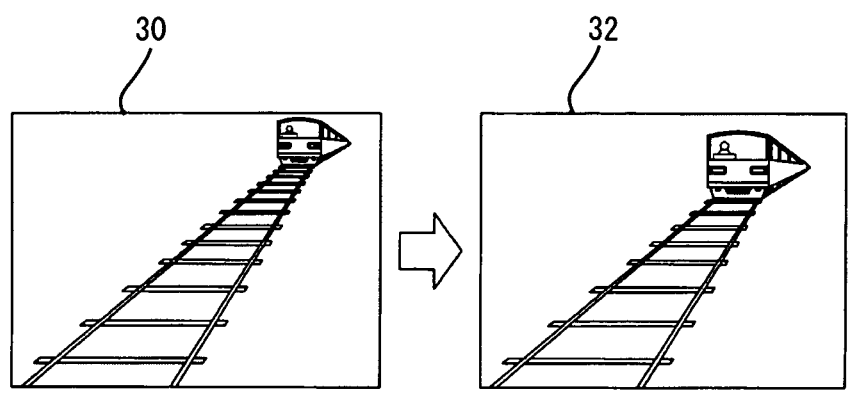
FIG. 7 is a diagram showing an example of a frame image used for detecting a movement velocity of a subject.

During a time that the user adjusts the focus while visually recognizing the through image in the state where the shutter button is half pressed, for example, the control unit 4 outputs at least two frame images created based upon the imaging signal from the imaging sensor 6, and resized (resolution reduced) to a resolution for use in subject motion information detection, e.g., frame images 30 and 32, as shown in FIG. 7, to the motion information detection unit 26. The movement information detection unit 26 calculates a motion vector by way of well-known motion vector calculation processing, based upon the frame images 30 and 32, detects the movement velocity of the moving subject (in FIG. 7, a train) based upon the calculated motion vector, and outputs the detection result to the control unit 4. Then, the control unit 4 acquires the movement velocity of the moving subject (in FIG. 7, a train) from the detection result from the movement information detection unit 26 (step S23).

Figure 8:
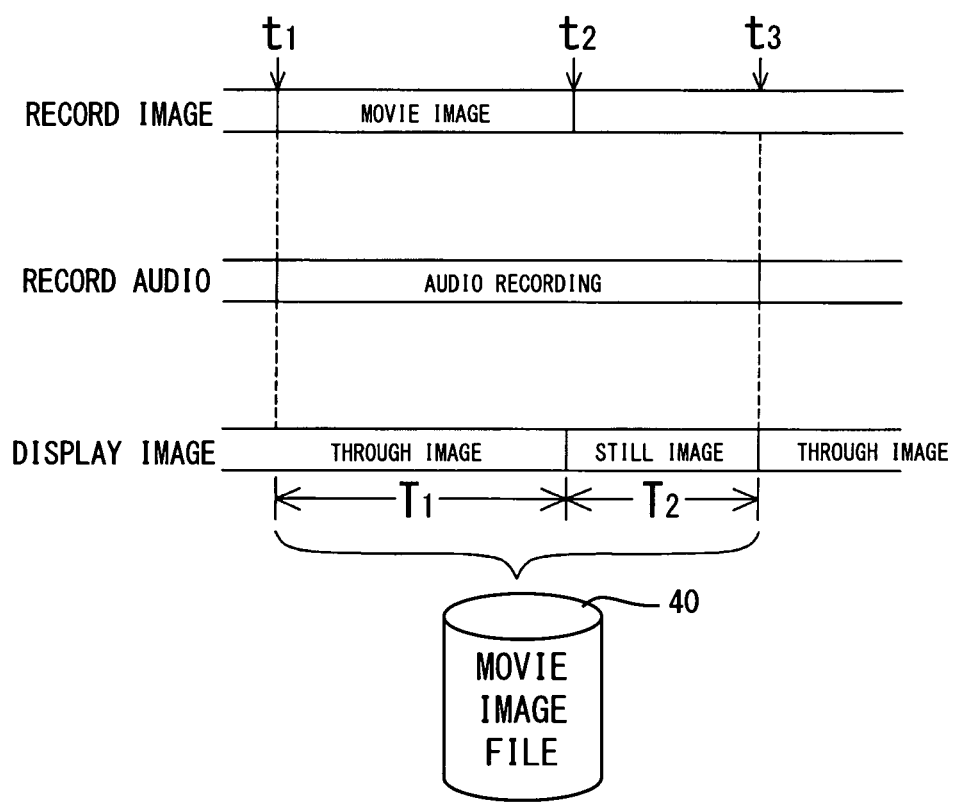
FIG. 8 is a time chart showing states of image recording, audio recording, and an image display.

Next, based upon the movement velocity of the subject (train) acquired in step S23, the control unit 4 sets the length of the recording time of the movie image (step S24). That is, when shooting the "movie image from moving to still" is selected in step S21, the length of the recording time T1 of the movie image which is shot from time t1 at which image recording and audio recording are started, up to time t2 at which image recording is ended and a still image is shot; and the length of the recording time T2 of the movie image created by using the still image shot at time t2 are set, as shown in FIG. 8.

Figure 9:
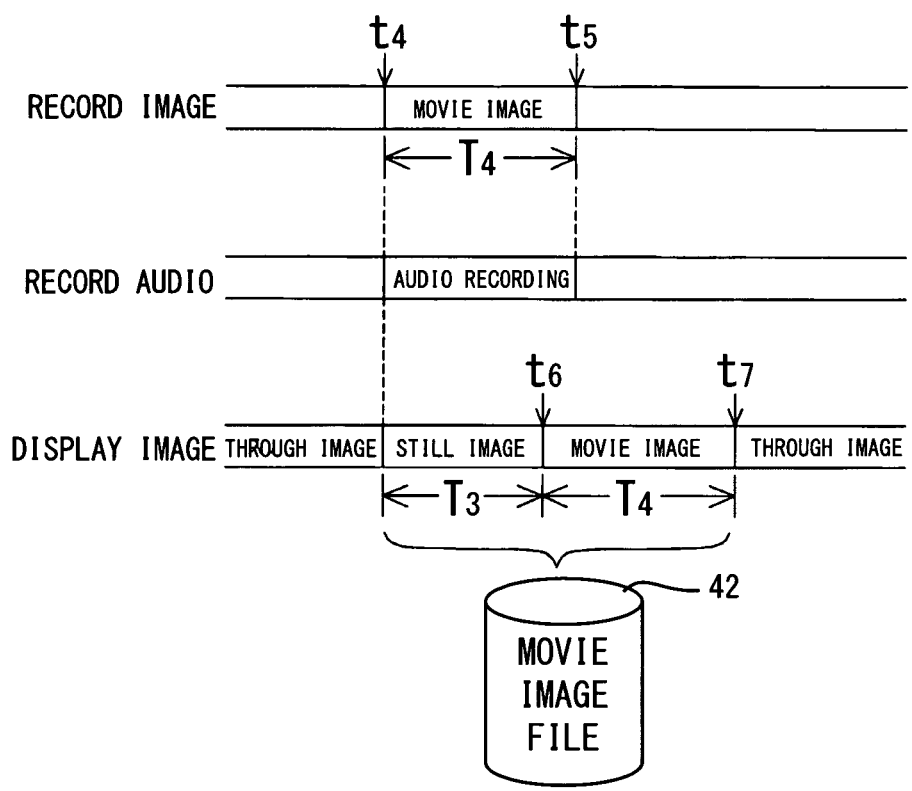
FIG. 9 is a time chart showing states of image recording, audio recording, and an image display.

Furthermore, when shooting the "movie image from still to moving" is selected in step S21, the length of the recording time T3 of the movie image created by using the still image shot at time t4; and the length of the recording time T4 of the movie image which is shot from time t4 at which image recording and audio recording are started, up to time t5 at which image recording and audio recording is ended are set, as shown in FIG. 9. It is to be noted that the movie image created by using the shot still image means a movie image formed by reproducing the shot still image in continuation for the time T2 (see FIG. 8, T3 in FIG. 9), specifically, a movie image so formed that a still image, which is resized to a resolution for a movie image, is used as a frame image.

If the movement velocity of the train acquired in step S23 is larger than a reference value set in advance, then the control unit 4 either shortens the recording times T1 and T4, or lengthens the recording times T2 and T3. Also, the control unit 4 further shortens the recording times T1 and T4 or further lengthens the recording times T2 and T3 according to the increase in the movement velocity of the train. That is, for a subject moving at high speed, the time period falling within the shooting screen is short, and therefore, by shortening the recording time of the movie image and lengthening the recording time of the still image, a movie image in which the subject moving at high speed is continuously reproduced over a longer period of time can be created.

Likewise, if the movement velocity of the train is smaller than the reference value, either the recording times T1 and T4 are lengthened, or the recording times T2 and T3 are shortened. Also, the control unit 4 further lengthens the recording times T1 and T4 or further shortens the recording times T2 and T3 according to the decrease in the movement velocity of the train. That is, for a subject moving at slow speed, the time period falling within the shooting screen is long, and therefore, by lengthening the recording time of the movie image and shortening the recording time of the still image, a movie image in which a state where the subject is moving is reproduced over a longer period of time can be created.

Furthermore, for example, a table for the length of the recording time T1 to time T4 corresponding to the movement velocity of the subject is stored in a memory (not shown), and the recording time T1 to time T4 can also be set based upon this table. Also, the length of the recording time T1+T2 for the "movie image from moving to still" and the length of the recording time T3+T4 for the "movie image from still to moving" are set in advance, and based upon the movement velocity of the train, the ratio of the recording time T1 to T2, or the ratio of the recording time T3 to T4 can also be set.

Although the control unit 4 sets both the recording times T1 and T2, or both the recording times T3 and T4 in step S24, the constitution may be such that the control unit 4 is set either one of the recording time T1 or T2, or either one of the recording time T3 or T4.

Figure 2:
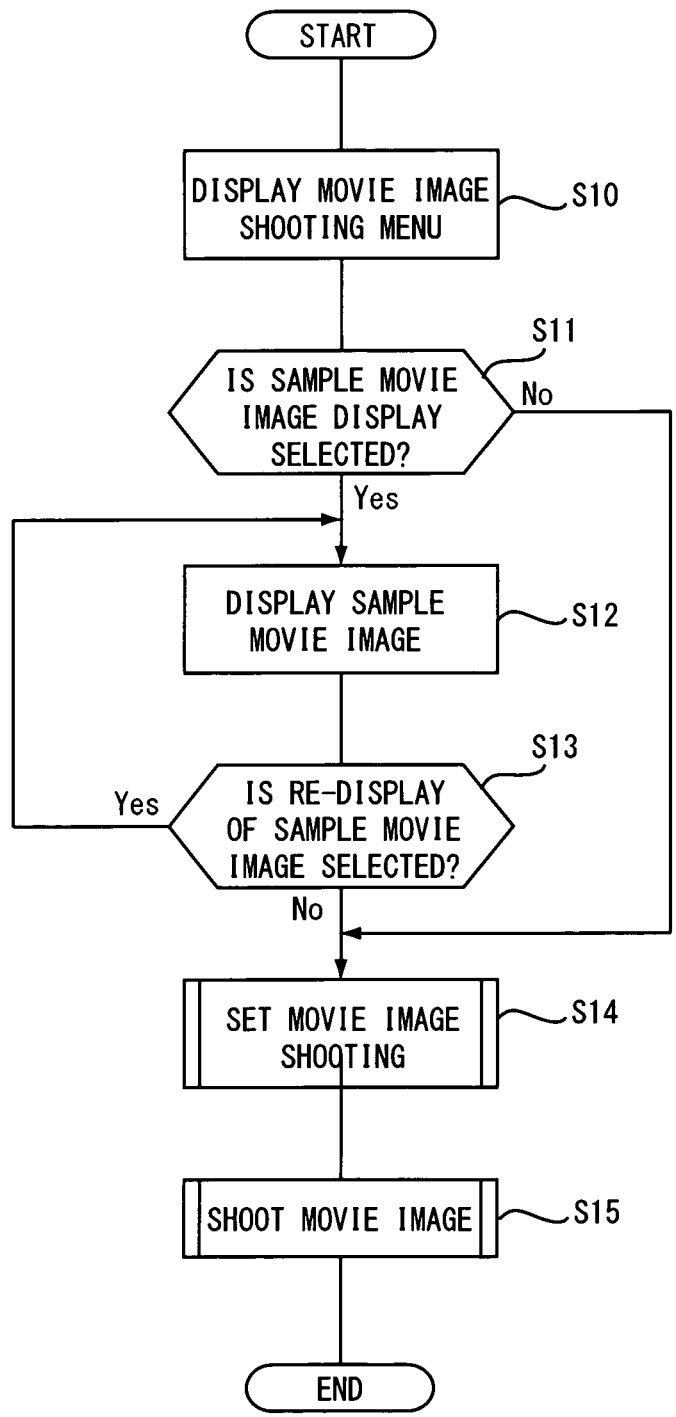
FIG. 2 is a flowchart explaining processing when shooting a movie image in the electronic camera according to the embodiment.
Figure 10:
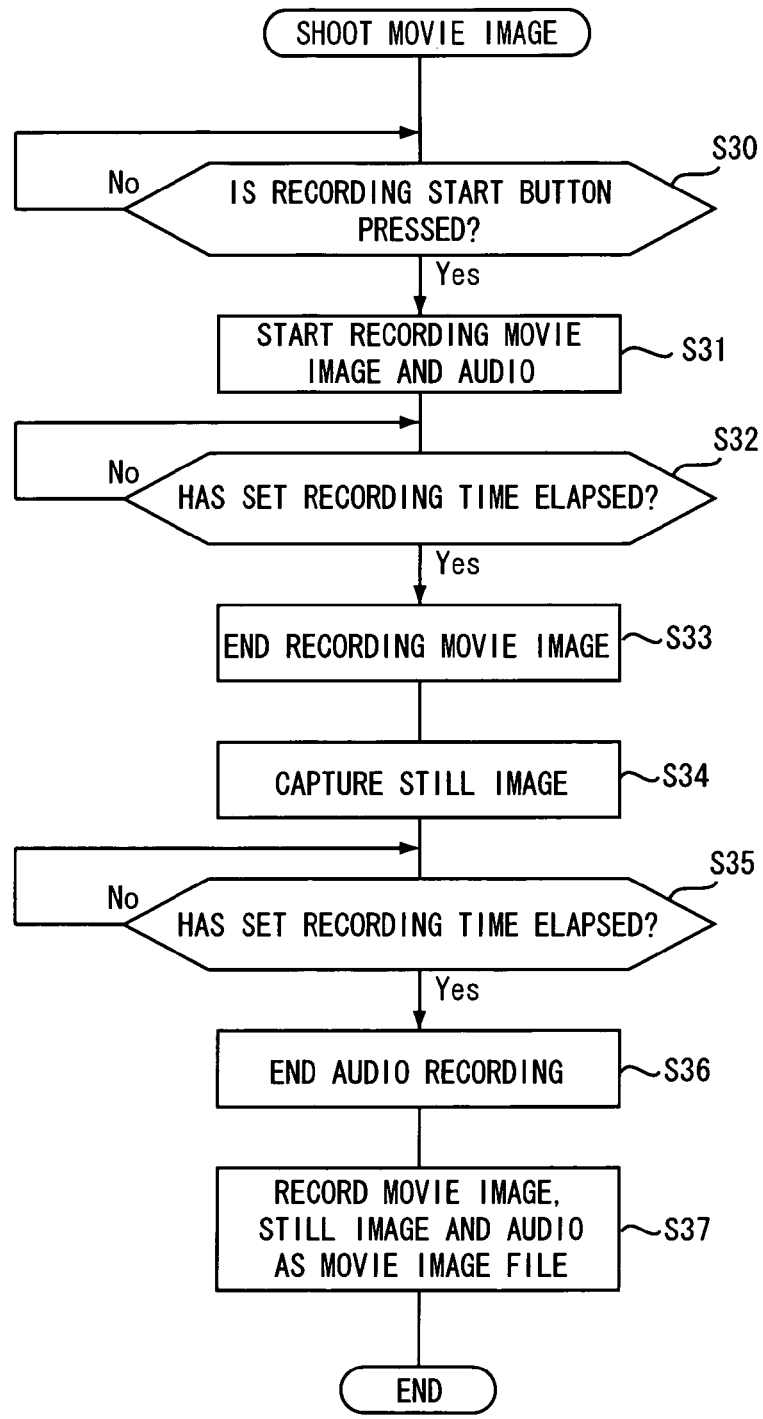
FIG. 10 is a flowchart explaining processing when shooting a "movie image from moving to still" in the electronic camera according to a first embodiment.

After completing the setting for the movie image shooting, the control unit 4 proceeds to the shooting of the movie image (step S15 in FIG. 2). FIG. 10 is a flowchart explaining the processing when shooting the "movie image from moving to still" in the scenario movie image shooting mode B.

Figure 11:
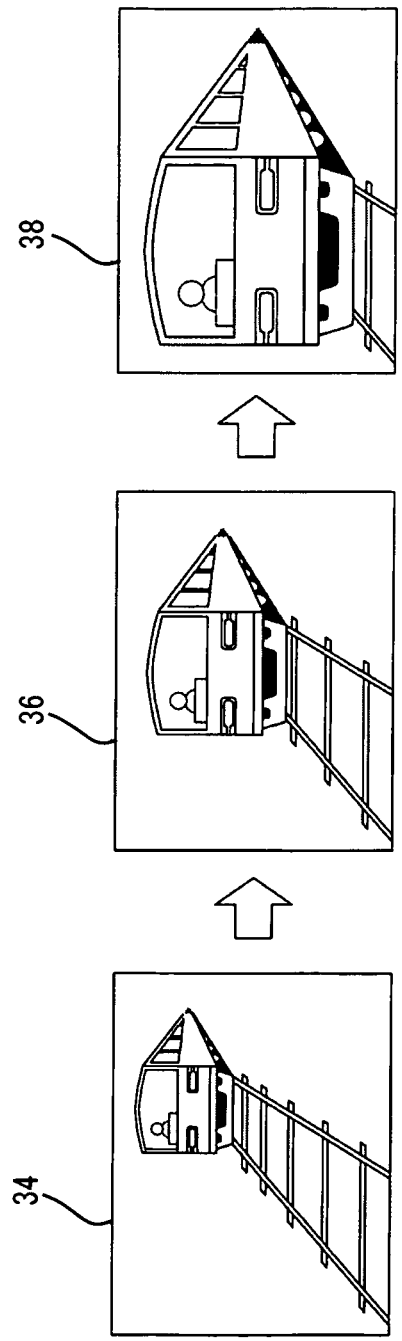
FIG. 11 is a diagram showing an example of a movie image to be shot.

First, the control unit 4 determines whether or not the recording start button (the REC button in this embodiment) has been pressed by a user (step S30). If it is determined in step S30 that the recording start button has been pressed (Yes in step S30), then the control unit 4 starts recording the movie image and the audio (step S31, time t1 in FIG. 8). It is to be noted that a through image when the recording start button is pressed in step S30 (time t1 in FIG. 8) is an image 34 shown in FIG. 11, and a through image after a time (T1/2) has elapsed from time t1 is an image 36 shown in FIG. 11. That is, in this embodiment, as shown in FIG. 11, from time t1 to time t2 (see FIG. 8), a movie image in which the train approaches the electronic camera 2 from a distance is recorded.

Next, the control unit 4 determines whether or not the recording time T1 set in step S24 in FIG. 6 has elapsed (step S32). If it is determined in step S32 that the recording time T1 has elapsed (Yes in step S32), the control unit 4 ends the recording of the movie image (step S33, time t2 in FIG. 8), and at the same time, captures at least one frame of a still image (step S34, time t2 in FIG. 8). It is to be noted that a through image when the recording of the movie image is ended in step S33 and the still image is captured in step S34 (time t2 in FIG. 8) is an image 38 shown in FIG. 11. Also, as shown in FIG. 8, even after the recording time T1 elapses, audio recording continues.

Next, the control unit 4 determines whether or not the recording time T2 set in step S24 in FIG. 6 has elapsed (step S35). If it is determined in step S35 that the recording time T2 has elapsed (Yes in step S35), the control unit 4 ends recording the audio (step S36, time t3 in FIG. 8).

Next, the control unit 4 puts together the following movie image data items of: movie image data produced based upon the imaging signal from the imaging sensor 6 between time t1 and time t2 (recording time T1); movie image data produced by using the still image (the image 38 shown in FIG. 11) shot at time t2 as a movie image between time t2 and time t3 (recording time T2) (which is movie image data produced by continuously reproducing one frame of the still image shot at time t2 for the period of the recording time T2); and audio data produced based upon the audio signal from the microphone 10 between time t1 and time t3, as a single movie image file 40 (see FIG. 8), and records this movie image file on the recording medium 18 (step S37). At this time, the audio data between time t2 and time t3 is recorded as audio data corresponding to the movie image data produced by using the still image.

It is to be noted that during the processing of steps S22 to S24 in FIG. 6 and steps S30 to S34 in FIG. 10, i.e., during the period from the display of the through image on the display surface of the display unit 20 until the still image is captured, the control unit 4 displays a through image based upon the imaging signal from the imaging sensor 6 on the display surface of display unit 20, as shown in FIG. 8. Then, during the processing of steps S35 to S36 in FIG. 10, i.e., during the period from the still image is captured until the elapse of the recording time T2, the captured still image (the image 38 shown in FIG. 11) is displayed on the display surface of display unit 20, as shown in FIG. 8. Then, after the recording time T2 elapses, i.e., from the time t3 onward, the through image is displayed again, as shown in FIG. 8.

When reproducing the movie image of the movie image file 40 recorded in step S37 in FIG. 10, a movie image in which during the recording time T1, the train approaches from the position in the image 34 to the position in the image 38 via the position in the image 36 is reproduced, and during the recording time T2, the image 38 is reproduced in continuation. In this way, an impressive movie image obtained by combining the state where the subject having movement is moving, and the state where the moving subject is stationary can be created and reproduced.

It is to be noted that in the above-described "movie image from moving to still", not only the image in which the same cuts are displayed in continuation in the same display states, as shown in the above embodiment, but the images of various types of modifications (which enable image representation that can be processed only because of the nature of the still image) can be assumed as the movie image data corresponding to the period for "still" (the movie image data produced as a movie image for the period of the recording time T2 based upon one frame of still image shot at time t2). For example, an image produced by performing digital zoom processing, such as gradual zoom-in (continuous partial magnification) of the still image shot at time t2 can also be produced as the movie image data. Alternatively, by using the still image, movie image data in which the still image appears to be gradually moving away from the display screen (for example, the still image can be rotated, or framed out of the display screen) can be produced.

Figure 12:
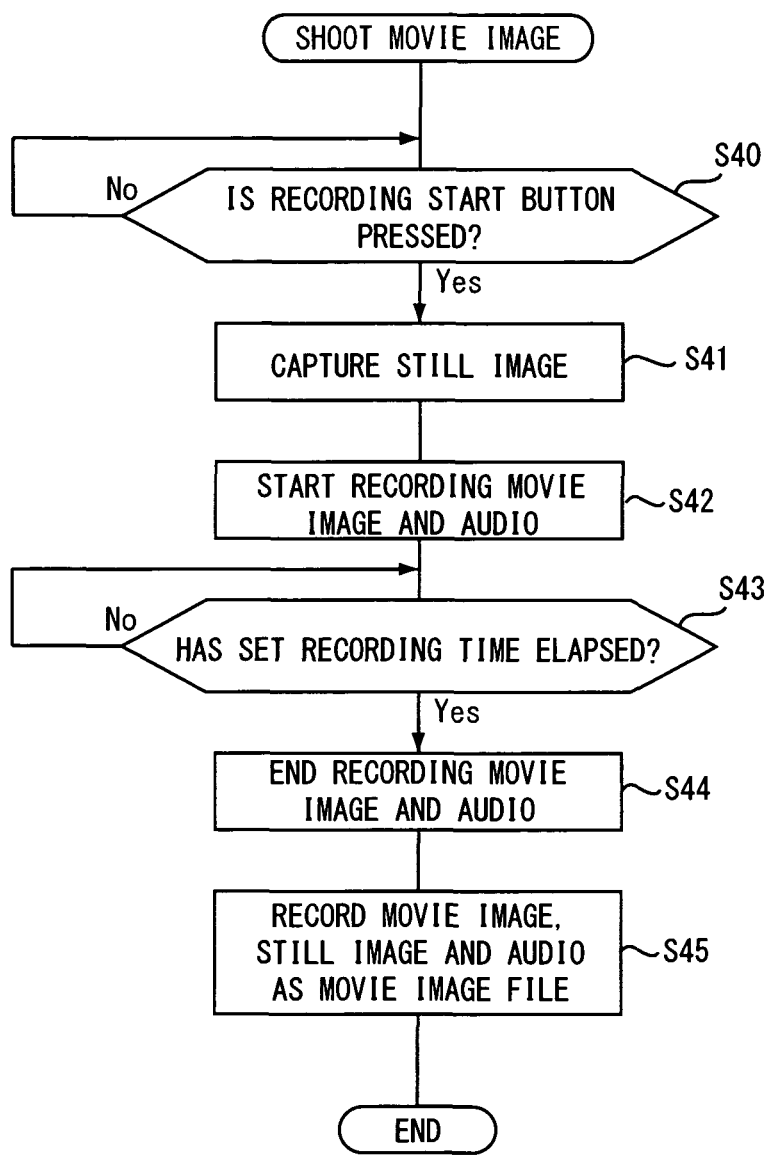
FIG. 12 is a flowchart explaining processing when shooting a "movie image from still to moving" in the electronic camera according to the first embodiment.

Next, with reference to a flowchart shown in FIG. 12, processing for shooting the "movie image from still to moving" in the scenario movie image shooting mode B is explained.

First, the control unit 4 determines whether or not the recording start button (the REC button in this embodiment) has been pressed by a user (step S40). If it is determined in step S40 that the recording start button has been pressed (Yes in step S40), then the control unit 4 starts capturing the still image (step S41, time t4 in FIG. 9), and at the same time, starts recording the movie image and the audio (step S42, time t4 in FIG. 9). It is to be noted that a through image when the still image is captured in step S41 and recording the movie image and the audio is started (time t4 in FIG. 9) is an image 34 shown in FIG. 11, and a through image after a time (T4/2) has elapsed from time t4 is an image 36 shown in FIG. 11. That is, in this embodiment, as shown in FIG. 11, from time t4 at which the image 34 is captured as the still image to time t5 (see FIG. 9), a movie image in which the train approaches the electronic camera 2 from a distance is recorded.

Next, the control unit 4 determines whether or not the recording time T4 set in step S24 in FIG. 6 has elapsed (step S43). If it is determined in step S43 that the recording time T4 has elapsed (Yes in step S43), the control unit 4 ends recording the movie image and the audio (step S44, time t5 in FIG. 9). It is to be noted that a through image when recording of the movie image and the audio is ended in step S44 (time t5 in FIG. 9) is an image 38 shown in FIG. 11.

Next, as shown in FIG. 9, as a movie image from time t4 to time t6 (recording time T3), the control unit 4 puts together the following movie image data items of: movie image data produced by using the still image (the image 34 shown in FIG. 11) captured at time t4 (movie image data produced by reproducing in continuation one frame of still image shot at time t4 for the period of recording time T3); movie image data based upon the movie image recorded from time t4 to time t5 (during the recording time T4); and audio data based upon the audio recorded from time t4 to time 5, into a single movie image file 42 (see FIG. 9), and records this movie image file 42 on the recording medium 18 (step S45).

It is to be noted that during the processing of steps S22 to S24 in FIG. 6 and steps S40 to S42 in FIG. 12, i.e., during the period from the display of the through image on the display surface of the display unit 20 until the start of recording the movie image and the audio, the control unit 4 displays a through image that is based upon the imaging signal from the imaging sensor 6 on the display surface of the display unit 20, as shown in FIG. 9. Then, as shown in FIG. 9, during the period from the start of recording the movie image and the audio until the lapse of the recording time T3 (from time t4 to time t6), the control unit 4 displays the captured still image (the image 34 shown in FIG. 11) on the display surface of display unit 20. Next, during the period from after the lapse of the recording time T3 until the lapse of the recording time T4 (from time t6 to time t7), the control unit 4 displays the movie image recorded from the time t4 to time t5 (movie image in which the train approaches the image 38 from the image 34 shown in FIG. 11) on the display surface of display unit 20. Then, after the recording time T4 elapses, i.e., from the time t7 onward, the control unit 4 displays the through image again.

Further, when reproducing the movie image of the movie image file 42 recorded in step S45 in FIG. 12, the image 34 is reproduced in continuation during the recording time T3, and during the recording time T4, a movie image in which the train approaches from the position in the image 34 to the position in the image 38 via the position in the image 36 is reproduced. Thus, an impressive movie image in which the subject starts to move after remaining stationary for a constant period of time can be created and reproduced. At this time, no audio is reproduced because no corresponding audio exists during the recording time T3, i.e., during the period while the image 34 is reproduced as a stationary movie image, and during the recording time T4, the audio corresponding to the movie image is reproduced.

It is to be noted that prior to the processing in step S37 in FIG. 10 and the processing in step S45 in FIG. 12, a message confirming recording to the recording medium 18 such as, "OK to record?" and selection options for selecting whether or not to record to the recording medium 18, such as, "Yes/No" may be displayed.

It is to be noted that in the above-described "movie image from still to moving", not only the image in which the same cuts are displayed in continuation in the same display states, as shown in the above embodiment, but the images of various types of modifications (which enable image representation that can be processed only because of the nature of the still image) can be assumed as the movie image data corresponding to the period for "still" (the movie image data produced as a movie image during the period of the recording time T3 based upon one frame of still image shot at time t4). For example, an image obtained by performing digital zoom processing (reduction in size) on the still image shot at time t4 so that the still image is gradually changed from being electrically zoomed-in to being zoomed-out may be produced as the movie image data. Alternatively, by using the still image, movie image data in which the still image appears to be gradually moving away from the display screen (for example, the still image can be rotated, or framed into the display screen) can be produced.

According to the electronic camera 2 of the first embodiment, a movie image obtained by combining the movie image and the still image of a subject having movement, i.e., a movie image having an impressive video effect can be created easily. That is, it is possible to create one movie image file obtained by linking a movie image in which the moving subject is moving and a movie image in which the subject is stationary.

While such a movie image is being recorded, instead of the through image, a movie image similar to that when the created movie image is reproduced is displayed on the display unit 20. That is, during the recording of the movie image, a preview of the created movie image can be displayed. Therefore, types of the video effects of the created movie image can be shown to the user during the recording of the movie image. Also, because the optimum recording times T1 to time T4 are set according to the movement velocity of the subject, a movie image having a more impressive video effect can be created.

Next, with reference to the drawings, an electronic camera according to a second embodiment of the present invention will be described. It is to be noted that the constitution of the electronic camera according to the second embodiment is the same as that of the electronic camera 2 according to the first embodiment except that the movement information detection unit 26 (see FIG. 1) is removed, and thus, the description will be omitted. Furthermore, the functions and operations of the electronic camera according to the second embodiment will be described using identical reference numerals for the configurations that are identical to the configurations in the electronic camera 2 shown in FIG. 1.

Also in the electronic camera according to the second embodiment, similarly to the electronic camera 2 according to the first embodiment, the movie image produced by combining the movie image and the still image of the subject having movement can be shot automatically, but the lengths of the recording time T1 shown in FIG. 8 and the recording time T4 shown in FIG. 9 are determined by the user through an instruction via the operation unit 24, and the lengths of the recording time T2 shown in FIG. 8 and recording time T3 shown in FIG. 9 are set in advance.

Figure 13:
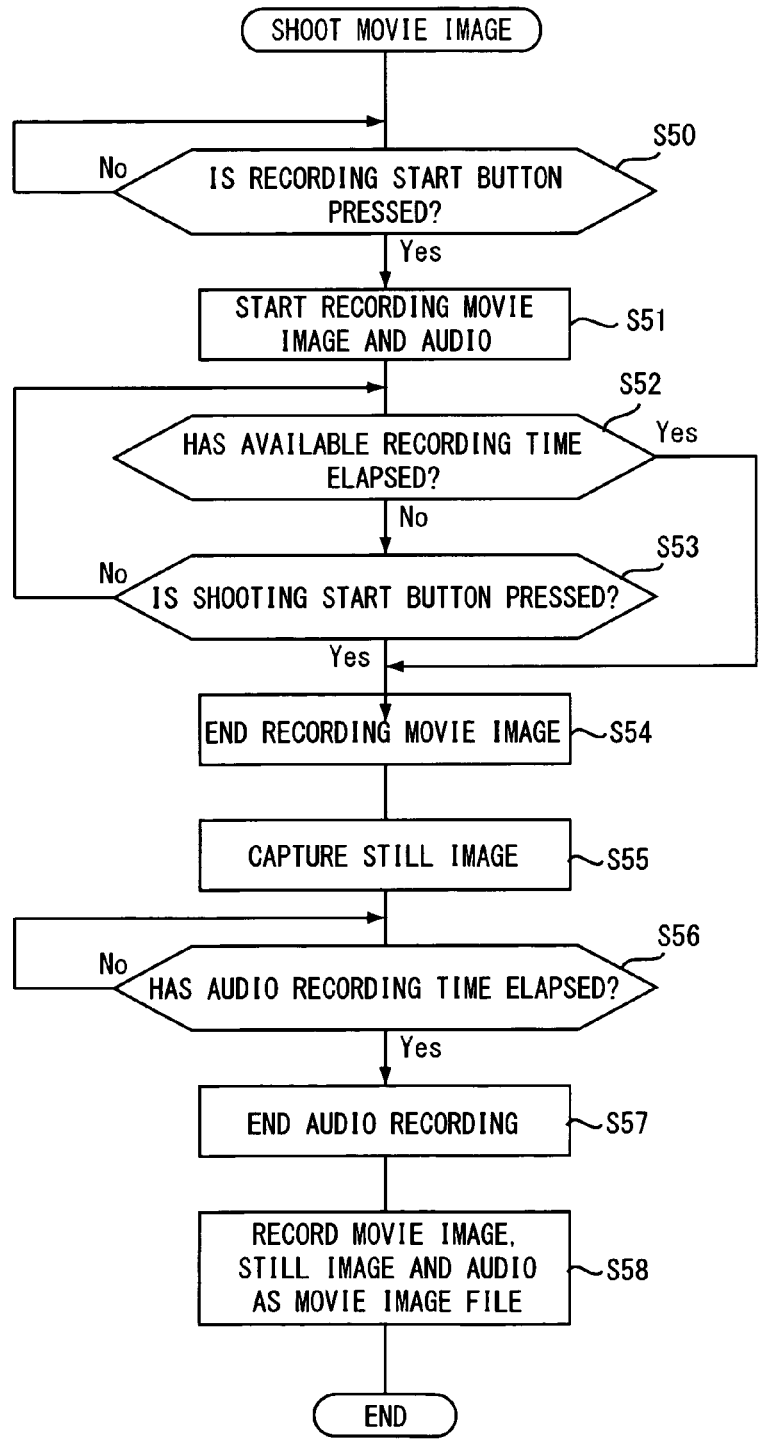
FIG. 13 is a flowchart explaining processing when shooting a "movie image from moving to still" in the electronic camera according to a second embodiment.

Therefore, in the second embodiment, after the processing in steps S10 to S13 shown in FIG. 2 are ended, the processing in steps S20 to S22 shown in FIG. 6 are performed as the processing in step S14. Also, instead of performing the processing in steps S23 and S24 shown in FIG. 6, the processing moves to the processing in step S15 shown in FIG. 2. FIG. 13 is a flowchart for explaining the processing for shooting the "movie image from moving to still" in the scenario movie image shooting mode B in the electronic camera according to the second embodiment. It is to be noted that the processing in steps S50 to S51 are the same as the processing in steps S30 to S31 shown in FIG. 10, and thus description thereof is omitted.

Next, the control unit 4 determines whether or not the available recording time has elapsed (step S52). The available recording time is the longest time set for the recording time T1 (from time t1 to time t2) shown in FIG. 8, set in advance based upon the capacity or the like of the recording medium 18, and stored in a memory or the like (not shown). In this embodiment, the available recording time is set to 10 seconds. When it is determined in step S52 that the available recording time, that is, 10 seconds does not elapse from time t1 (No in step S52), the control unit 4 determines whether or not the user has pressed the shooting start button (the REC button or the shutter button in this embodiment) (step S53). If it is determined in step S53 that the shooting start button is not pressed (No in step S53), the control unit 4 returns to the processing in step S52 so as to repeat the processing in steps S52 and S53.

Meanwhile, if it is determined in step S52 that the available recording time has elapsed (Yes in step S52) or if it is determined in step S53 that the shooting start button has been pressed (Yes in step S53), the control unit 4 ends the recording of the movie image (step S54, time t2 in FIG. 8) and at the same time, captures the still image (step S55, time t2 in FIG. 8).

Next, the control unit 4 determines whether or not the audio recording time has elapsed (step S56). The audio recording time is the recording time T2 shown in FIG. 8, and the recording time T2 is the recording time of the movie image created by using the still image captured in step S55. The recording time T2 is set in advance based upon the capacity or the like of the recording medium 18, and stored in a memory (not shown) or the like. In this embodiment, the recording time T2 is set to five seconds. If it is determined in step S56 that the audio recording time, i.e., recording time T2 has elapsed (Yes in step S56), the control unit 4 ends the recording of the audio (step S57, time t3 in FIG. 8), and performs the processing in step S58. It is to be noted that the processing in step S58 is the same as the processing in step S37 shown in FIG. 10, and thus description thereof is omitted.

Figure 14:
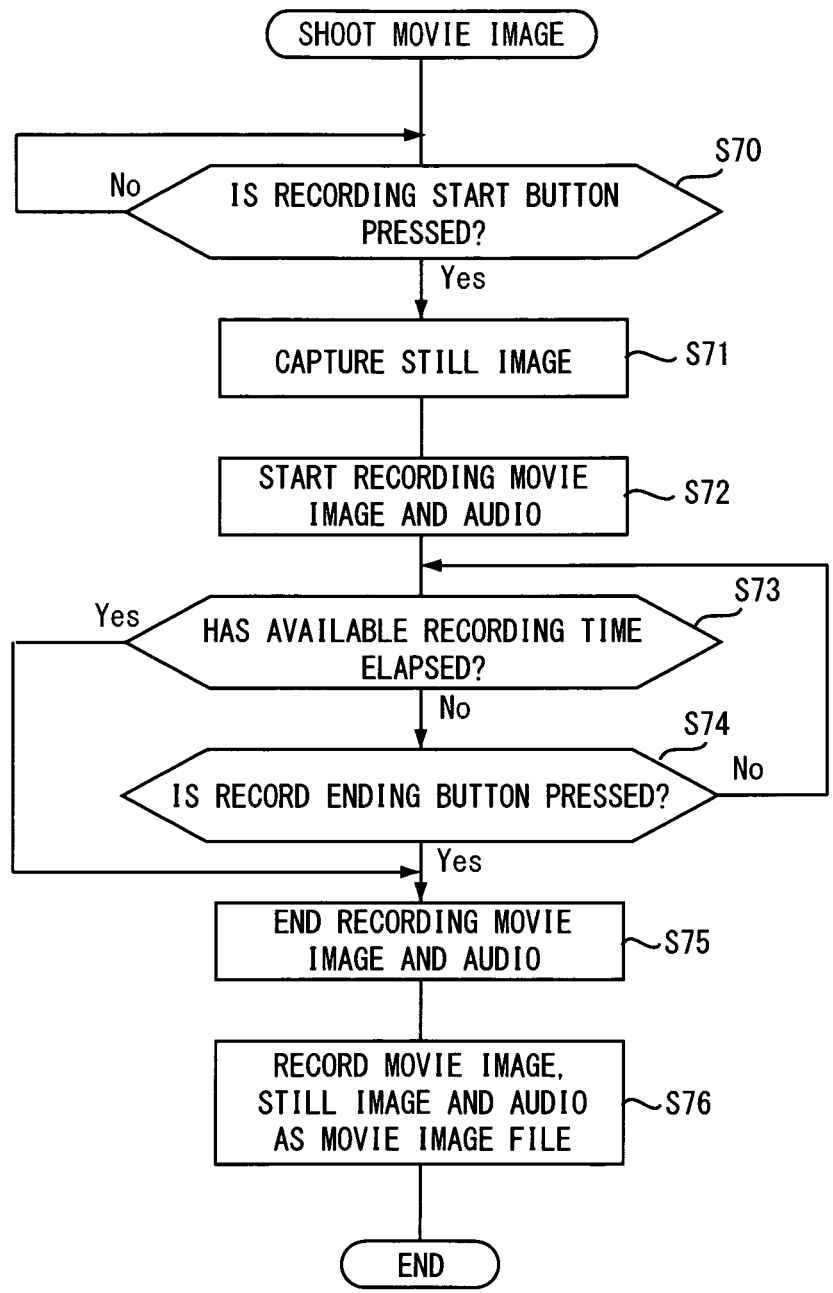
FIG. 14 is a flowchart explaining processing when shooting a "movie image from still to moving" in the electronic camera according to the second embodiment.

Next, with reference to a flowchart shown in FIG. 14, processing for shooting the "movie image from still to moving" in the scenario movie image shooting mode B in the electronic camera according to the second embodiment is explained. It is to be noted that the processing in steps S70 to S72 are the same as the processing in steps S40 to S42 shown in FIG. 12, and thus description thereof is omitted.

Next, the control unit 4 determines whether or not the available recording time has elapsed (step S73). The available recording time is the longest time set for the recording time T4 (from time t4 to time t5) shown in FIG. 9, set in advance based upon the capacity or the like of the recording medium 18, and stored in a memory or the like (not shown). In this embodiment, the available recording time is set to 10 seconds. When it is determined in step S73 that the available recording time, i.e., 10 seconds does not elapse from time t4 (No in step S73), the control unit 4 determines whether or not the user has pressed the recording end button (the REC button in this embodiment) (step S74). If it is determined in step S74 that the recording end button is not pressed (No in step S74), the control unit 4 returns to the processing in step S73 so as to repeat the processing in steps S73 and S74.

Meanwhile, if it is determined in step S73 that the available recording time has elapsed (Yes in step S73) or if it is determined in step S74 that the recording end button has been pressed (Yes in step S74), the control unit 4 ends the recording of the movie image and the audio (step S75, time t5 in FIG. 9) and performs processing in S76. It is to be noted that the processing in steps S76 is the same as the processing in step S45 shown in FIG. 12, and thus description thereof is omitted. The recording time T3 shown in FIG. 9 is set in advance based upon the capacity or the like of the recording medium 18, and stored in a memory (not shown) or the like. In this embodiment, the recording time T3 is set to five seconds.

According to the electronic camera of the second embodiment, because the recording times T1 and T4 can be set freely insofar as not to exceed the available recording time during shooting, and the recording times T2 and T3 are set in advance, a movie image having an impressive video effect can be created easily even if the motion information detection unit is not provided.

It is to be noted that in the second embodiment, although the recording times T2 and T3 are set in advance, the recording times T2 and T3 set in advance may be set as defaults and may be changed. In this case, items for setting the recording times T2 and T3 are added to the menu items in the menu, and before shooting the movie image, the menu screen is displayed on the display unit 20, and the recording times T2 and T3 are set by way of operations using the cross key or the like. Also, the recording times T1 and T4 are set freely insofar as not to exceed the available recording time during shooting, but similarly to the recording times T2 and T3, the recording times T1 and T4 may also be set in advance prior to shooting.

In addition, in the second embodiment, the available recording time is set in advance and to record longer than the available recording time is not allowed, but the constitution may be such that the image recording and the audio recording continue until the recording end button is pressed by the user. Moreover, the constitution may also be such that the available recording time that is set in advance is used as a default, and it is possible to change the available recording time.

Further, also in the case of shooting the "movie image from still to moving" or the "movie image from moving to still" in the second embodiment, various types of modifications such as those already described in the first embodiment are applicable to the movie image data corresponding to the period of "still".

It is to be noted that in each of the above-described embodiments, only one frame of the still image is used as the basis for creating the movie image data corresponding to the period of the "still", however, the present invention is not restricted thereto and movie image data for the period of "still" can also be created based upon a plurality of frames of still images shot in continuation. For example, by combining a plurality of still images shot in continuation under the different exposure conditions, a still image having extended dynamic range (still image for which the so-called High Dynamic Range (HDR) processing has been performed) is obtained, and movie image data can also be created based upon the HDR image.

It is to be noted that in each of the above-described embodiments, when recording the movie image file 42 of the "movie image from still to moving", the audio corresponding to the movie image created by using the still image is not recorded, however, the audio from the time of capturing the still image up to before the length of the recording time T3 (see FIG. 9) may be recorded and this audio may also be added to the movie image file 42 as audio corresponding to the movie image created by using the still image. In this case, for example, from the time of capturing the still image up to the point prior to the predetermined time (≧length of the recording time T3), recording of the audio is started when the audio recording start instruction button (for example, the REC button or the OK button) is pressed by the user, and the audio from the time of capturing the still image up to before the length of the recording time T3 is added to the movie image file 42 when creating the movie image file 42.

Also, in each of the above-described embodiments, either the "movie image from moving to still" or the "movie image from still to moving" is created, however, a "movie image of moving, still, and moving" may also be created by combining the "movie image from moving to still" and the "movie image from still to moving". That is, after shooting a movie image of the moving subject (first movie image), a still image of the moving subject can be shot; and then after shooting the still image, a movie image of the moving subject (third movie image) can be shot again; and a movie image (second movie image) can be produced by using the shot still image, whereby a movie image can be created by linking the first movie image, the second movie image, and the third movie image.

Next, with reference to the drawings, an electronic camera will be described as an image processing device according to a third embodiment of the present invention. It is to be noted that the electronic camera according to the third embodiment has the same constitution as the electronic camera 2 according to the first embodiment, and thus a description thereof will be omitted. Furthermore, the functions and operations of the electronic camera according to the third embodiment will be described using identical reference numerals for the configurations that are identical to the configurations in the electronic camera 2 shown in FIG. 1.

In the third embodiment, the control unit 4 temporarily stores the movie image data in the movie image file recorded on recording medium 18, in the movie-image buffer memory 12. Similarly, the control unit 4 temporarily stores, as still image data, at least one frame image, from among a plurality of frame images forming the movie image data in the movie image file recorded on recording medium 18, in the still-image buffer memory 14, and temporarily stores the audio data in the movie image file recorded on the recording medium 18, in the audio buffer memory 16. Also, when creating a scenario movie image (described later) based upon the movie image file recorded on the recording medium 18 in the electronic camera 2, the motion information detection unit 26 detects the motion information of the subject having movement in the movie image that is based upon the movie image file, and outputs the detection result to the control unit 4. Specifically, first, at least two frame images from among a plurality of frame images that form the movie image data in the movie image file are resized (resolution reduced) to a resolution for use in the subject movement information detection, by way of a compression circuit (not shown) in the control unit 4. Then, a motion vector is calculated from the resized at least two frame images, by way of a well-known motion vector calculation processing, and the movement information of the subject having movement (in this embodiment, the movement velocity of the subject) is detected based upon the calculated motion vector.

Figure 15:
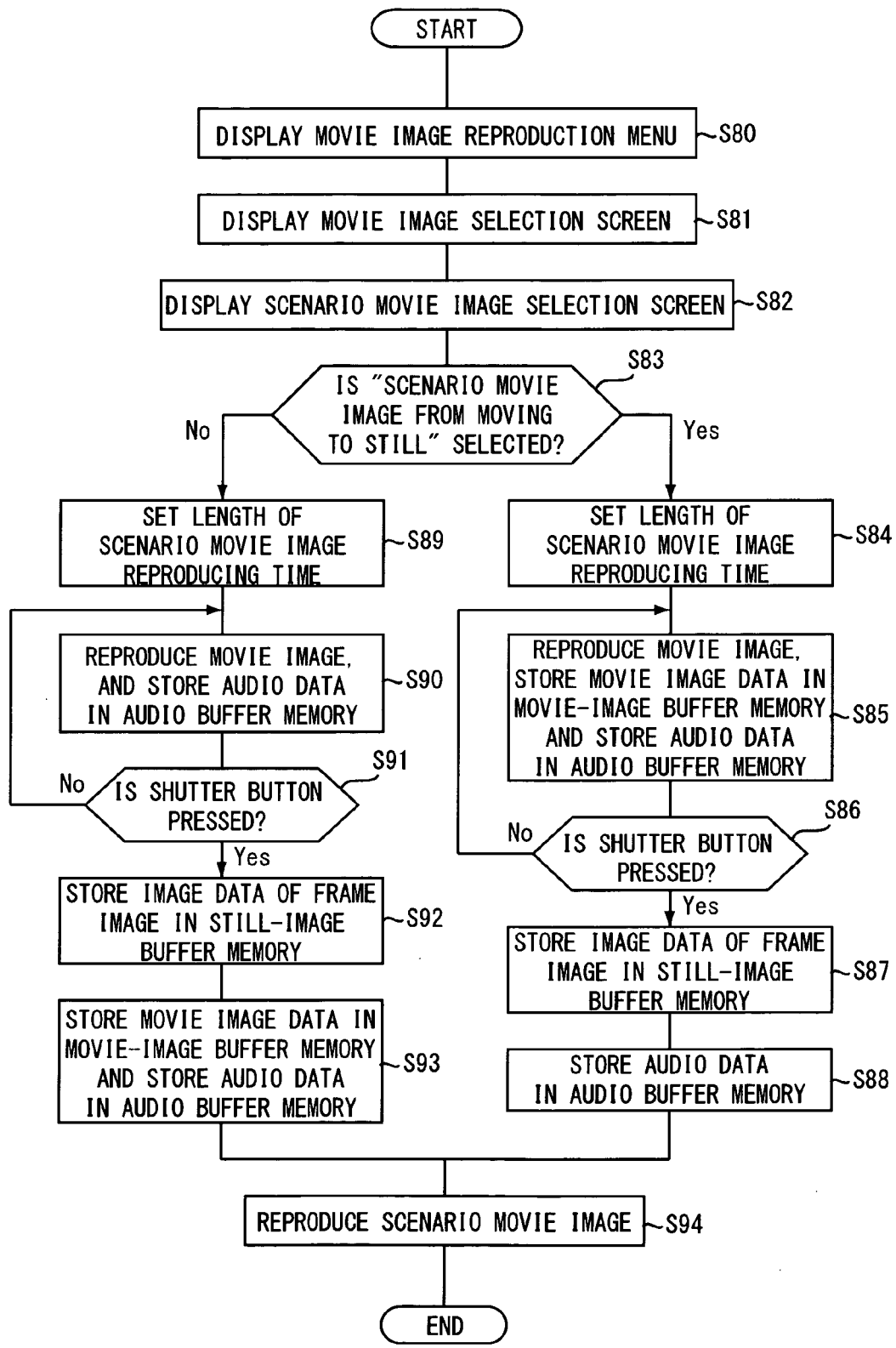
FIG. 15 is a flowchart explaining processing when reproducing a scenario movie image in an electronic camera according to a third embodiment.

In the electronic camera 2 according to this embodiment, based upon a movie image file including a movie image and audio, which are shot by the electronic camera 2 and recorded on the recording medium 18, a scenario movie image produced by combining a movie image and a still image of a subject having movement can be automatically created and the created scenario movie image can be reproduced. Hereinafter, with reference to a flowchart shown in FIG. 15, description is given of the processing when reproducing the above-described scenario movie image with the electronic camera 2 according to the third embodiment.

First, when the instruction for displaying the movie image reproduction menu (for example, pressing of the menu button) is performed by the user, the control unit 4 displays the movie image reproduction menu screen on the display unit 20 (step S80). Items that allow for selecting various movie image reproduction modes (for example, the scenario movie image reproduction modes A, B, C, D, and E) are displayed on the movie image reproduction menu screen. If the user selects one movie image reproduction mode (in this embodiment, this is the scenario movie image reproduction mode A), using the cross key or the like, and presses the OK button, the control unit 4 moves to the scenario movie image reproduction mode A. It is to be noted that in this embodiment, the scenario movie image reproduction mode A is a mode for creating and reproducing a scenario movie image in which the still image is displayed as if to start moving or the moving subject is displayed as if to be stationary (hereinafter, simply referred to as scenario movie image). Furthermore, the movie image reproduction modes includes not only the mode for creating and reproducing the above-described scenario movie image, but also movie image reproduction modes (other scenario reproduction modes B through E) in which the movie image is reproduced and displayed according to scenarios different from each other in each mode and which provide various video effects, e.g., a mode for creating and reproducing an movie image in which a moving subject moves discontinuously.

Next, when the control unit 4 moves to the scenario movie image reproduction mode A, the control unit 4 displays a movie image selection screen on the display unit 20 to allow the user to select a movie image file that is the basis of creating the scenario movie image, i.e., one of the movie image files that are recorded on the recording medium 18 (step S81). Specifically, the control unit 4 displays a list of movie image files that are recorded on the recording medium 18, such as a list of filenames or a list of thumbnail images of representative frame images, on the display unit 20, and allows the user to select one of the movie image files using the cross key or the like.

When one movie image file is selected by the user by using the cross key and the like, and the OK button is pressed, the control unit 4 displays the scenario movie image selection screen on the display unit 20 in the form of a menu display (not shown) to allow the user to select whether or not to create a "scenario movie image from moving to still", or a "scenario movie image from still to moving" (step S82). Then, the control unit 4 determines whether or not the "scenario movie image from moving to still" is selected by the user (step S83). If it is determined in step S83 that the "scenario movie image from moving to still" is selected by the user (Yes in step S83), the control unit 4 sets the length of the reproducing time of the scenario movie image when a scenario movie image from moving to still is created (step S84). That is, the length of the reproducing time of the scenario movie image formed by: the first movie image produced by using the frame images recorded during a first predetermined time before the recording time while predetermined frame images from among a plurality of frame images forming the movie image data (hereinafter, referred to as original movie image data) within the movie image file selected in step S81 is recorded; and a second movie image produced by using predetermined frame images in the length of a second predetermined time is set.

Specifically, the control unit 4 resizes at least two frame images from among a plurality of frame images that form the original movie image data to a resolution for use in movement information detection, and outputs the at least two frame images to the movement information detection unit 26. The movement information detection unit 26 detects the movement information of the subject (in FIG. 7, the train) using well known motion vector calculation processing, based upon the at least two resized frame images (for example, frame images 30 and 32 shown in FIG. 7), and outputs the detection result to the control unit 4. The control unit 4 calculates the movement velocity of the subject based upon the movement information of the subject detected by the motion information detection unit 26, and sets the lengths of the first predetermined time and second predetermined time based upon the calculated movement velocity of the subject.

For example, if the movement velocity of the subject is greater than a reference value set in advance, then the first predetermined time is shortened, or the second predetermined time is lengthened. Also, the first predetermined time is further shortened, or the second predetermined time is further lengthened according to the increase in the movement velocity of the subject. That is, for a subject moving at high speed, the time period falling within the reproduction screen is short, and therefore, by shortening the reproducing time of the movie image and lengthening the reproducing time of the still image, a movie image in which the subject moving at high speed is continuously reproduced over a longer period of time can be created.

Similarly, if the movement velocity of the subject is smaller than the reference value, the first predetermined time is lengthened, or the second predetermined time is shortened. Also, the first predetermined time is further lengthened, or the second predetermined time is further shortened according to the decrease in the movement velocity of the subject. That is, for a subject moving at slow speed, the time period falling within the reproduction screen is long, and therefore, by lengthening the recording time of the movie image and shortening the recording time of the still image, a movie image in which a state where the subject is moving is reproduced over a longer period of time can be created.

Figure 16:
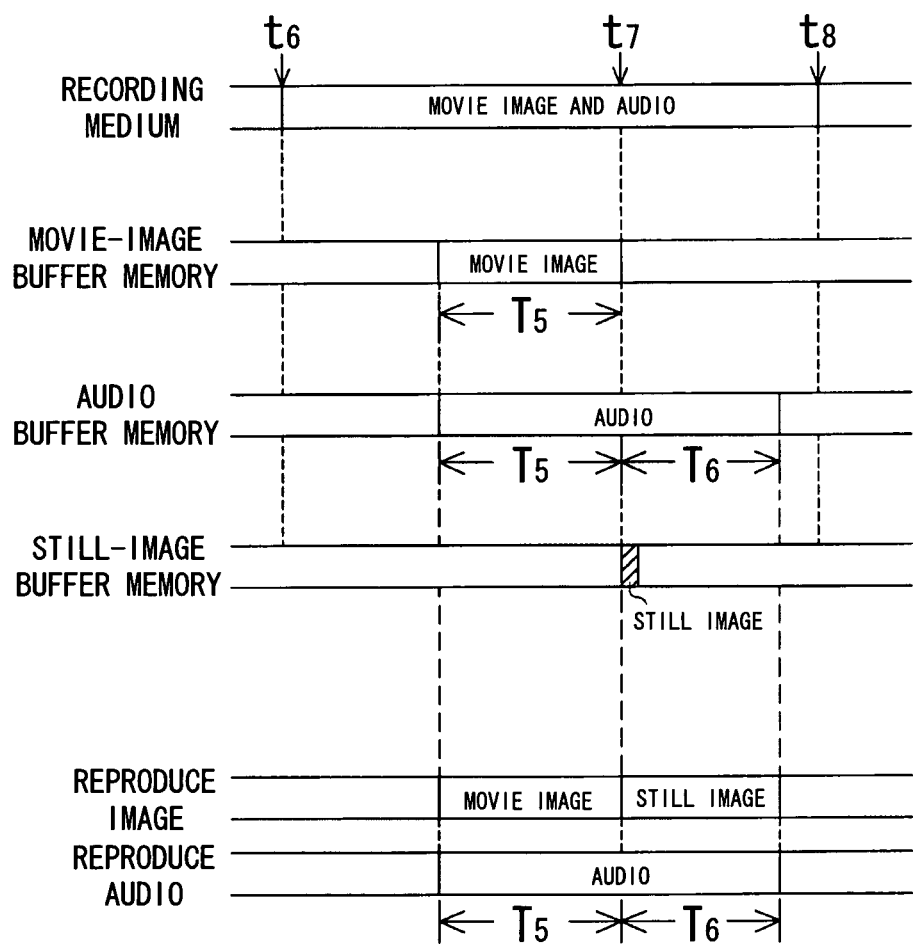
FIG. 16 is a time chart explaining processing when reproducing a "scenario movie image from moving to still"

Next, as shown in FIG. 16, the control unit 4 reproduces the movie image based upon the original movie image data (from time t6 to time t8), and stores the reproduced original movie image data in the movie-image buffer memory 12, and stores the audio data (hereinafter, referred to as original audio data) in the movie image file selected in step S81 in the audio buffer memory 16 (step S85). That is, a plurality of frame images forming the original movie image data are displayed sequentially on the display unit 20, the frame images displayed on the display unit 20 are stored sequentially in the movie-image buffer memory 12, and the audio data corresponding to the frame images stored in the movie-image buffer memory 12 is stored sequentially in the audio buffer memory 16. At this time, if the reproducing time of the movie image data stored in the movie-image buffer memory 12 exceeds the first predetermined time set in step S84, the oldest frame image stored in the movie-image buffer memory 12 is deleted, and the most recent frame image displayed on the display unit 20 is stored in the movie-image buffer memory 12. The same holds true when the reproducing time of the audio data stored in the audio buffer memory 16 exceeds the first predetermined time set in step S84. It is to be noted that in step S85, along with the reproduction of the movie image that is based upon the original movie image data, the audio corresponding to the movie image (audio based upon the original audio data) can also be reproduced from time t6 to time t8.

Next, the control unit 4 determines whether or not the shutter button is pressed by the user (step S86). If it is determined in step S86 that the shutter button is pressed (Yes in step S86), the control unit 4 ends the processing of storing the original movie image data in the movie-image buffer memory 12, and at the same time, stores the image data of frame image, as the still image data, displayed on the display unit 20 when the shutter button is pressed (in FIG. 16, time t7) in the still-image buffer memory 14 (step S87). That is, as shown in FIG. 16, during the period from the reproduction of the movie image is started at time t6 until the shutter button is pressed at time t7, the movie image data are stored in the movie-image buffer memory 12 in the FIFO (First In First Out) format, and therefore, at time t7, the movie image data of the movie image displayed on the display unit 20 during the period from time t7 until before the first predetermined time T5 is stored in the movie-image buffer memory 12. Similarly, the audio data of audio output to the speaker 22 during the period from time t7 until before the first predetermined time T5 is stored in the audio buffer memory 16, and the image data 15, of the frame images displayed on the display unit 20 at time t7 is stored in the still-image buffer memory 14.

Thus, after the processing in step S87, the control unit 4 continues to store the audio data in the audio buffer memory 16 during the period from time t7 until the lapse of the second predetermined time T6 (step S88).

On the other hand, if it is determined in step S83 that the "scenario movie image from moving to still" is not selected by the user, i.e., the "scenario movie image from still to moving" is selected by the user (No in step S83), the control unit 4 sets the length of the reproducing time of the scenario movie image when a scenario movie image from still to moving is created (step S89). That is, the control unit 4 sets the lengths of the reproducing time of a scenario movie image formed by: a second movie image produced in the length of the second predetermined time by using the predetermined frame images from among the plurality of frame images forming the original movie image data; and a third movie image produced by using the frame images recorded during the third predetermined time following the recording time when the predetermined frame images are recorded. A specific setting method is the same as that in step S84, and therefore, its detailed explanation is omitted.

For example, if the movement velocity of the subject is greater than a reference value set in advance, then the third predetermined time is shortened, or the second predetermined time is lengthened. Also, the third predetermined time is further shortened, or the second predetermined time is further lengthened according to the increase in the movement velocity of the subject. Further, if the movement velocity of the subject is smaller than the reference value, the third predetermined time is lengthened, or the second predetermined time is shortened. Moreover, the third predetermined time is further lengthened, or the second predetermined time is further shortened according to the decrease in the movement velocity of the subject.

Figure 17:
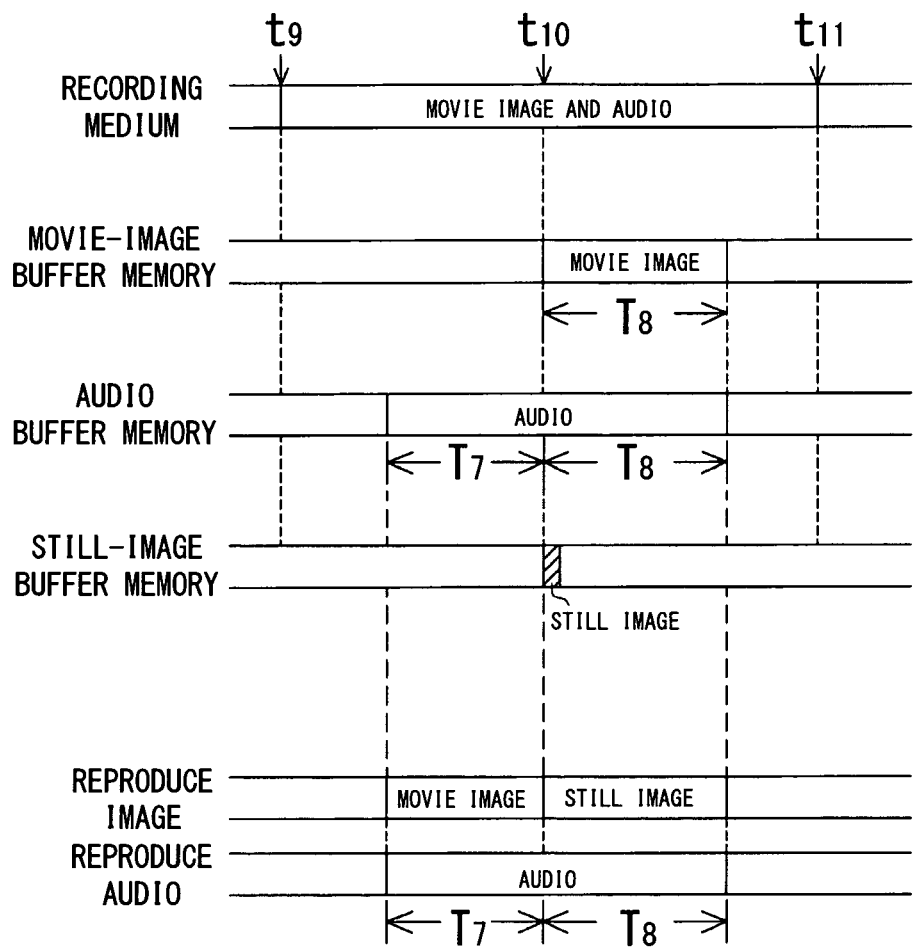
FIG. 17 is a time chart explaining processing when reproducing a "scenario movie image from still to moving"

Next, as shown in FIG. 17, the control unit 4 reproduces the movie image that is based upon the original movie image data (from time t9 to time t11), and stores the original audio data in the audio buffer memory 16 (step S90). That is, the audio data corresponding to the frame images displayed on the display unit 20 is stored sequentially in the audio buffer memory 16. At this time, if the reproducing time of the audio data stored in the audio buffer memory 16 exceeds the second predetermined time set in step S89, then the oldest audio data stored in the audio buffer memory 16 is deleted, and the audio data corresponding to the most recent frame image displayed on the display unit 20 is stored in the audio buffer memory 16. It is to be noted that along with the reproduction of the movie image that is based upon the original movie image data, the audio corresponding to the movie image (audio based upon the original audio data) can also be reproduced from time t9 to time t11.

Next, the control unit 4 determines whether or not the shutter button is pressed by the user (step S91). If it is determined in step S91 that the shutter button is pressed (Yes in step S91), the control unit 4 stores, as the still image data, the image data of the frame images displayed on the display unit 20 when the shutter button is pressed (in FIG. 17, time t10), in the still-image buffer memory 14 (step S92). That is, as shown in FIG. 17, during the period from the reproduction of the movie image is started at time t9 until the shutter button is pressed at time t10, the audio data is stored in the audio buffer memory 16 in the FIFO format, and therefore, at time t10, the audio data of audio output to the speaker 22 during the period from time t10 until before the second predetermined time T7 is stored in the audio buffer memory 16.

Then, after the processing in step S92, during the period from time t10 until the lapse of the third predetermined time T8, the control unit 4 continues to store the movie image data of the movie image displayed on the display unit 20 in the movie-image buffer memory 12 and continues to store the audio data in the audio buffer memory 16 (step S93).

Next, the control unit 4 sequentially reads out the movie image data, the still image data, and the audio data that have been stored in the moving-mage buffer memory 12, the still-image buffer memory 14, and the audio buffer memory 16, respectively, so as to reproduce the scenario movie image (step S94). When reproducing the image in the "scenario movie image from moving to still", as shown in FIG. 16, first, the frame images stored in the moving-mage buffer memory 12 are displayed sequentially on the display unit 20 during the first predetermined time T5, and then after the lapse of the first predetermined time T5, the still image (predetermined frame image) stored in the still-image buffer memory 14 is displayed continuously on the display unit 20 during the second predetermined time T6. Then, when reproducing the audio in the "scenario movie image from moving to still", as shown in FIG. 16, the audio based upon the audio data stored in the audio buffer memory 16 is output sequentially to the speaker during the first predetermined time T5 and second predetermined time T6.

On the other hand, when reproducing the image in the "scenario movie image from still to moving", as shown in FIG. 17, first, the still image (predetermined frame image) stored in the still-image buffer memory 14 is displayed continuously on the display unit 20 during the second predetermined time T7, and then after the lapse of the second predetermined time T7, the frame images stored in the movie-image buffer memory 12 are displayed sequentially on the display unit 20 during the third predetermined time T8. Then, When reproducing the audio in the "scenario movie image from still to moving", as shown in FIG. 17, the audio based upon the audio data stored in the audio buffer memory 16 is output sequentially to the speaker 22 during the second predetermined time T7 and third predetermined time T8.

It is to be noted that the scenario movie image that is reproduced in step S94, i.e., the movie image data, the still image data, and the audio data that are stored in the moving-mage buffer memory 12, the still-image buffer memory 14, and the audio buffer memory 16, respectively, can also be recorded on the recording medium 18 as a movie image file of a single scenario movie image. In this case, for example, after reproducing the scenario movie image, the control unit 4 displays a selection screen on the display unit 20 for selecting whether or not to record the scenario movie image that has been reproduced on the recording medium 18, and if the user indicates that this is to be recorded, it is recorded.

According to the electronic camera 2 of the third embodiment, a scenario movie image obtained by combining a movie image and a still image of a subject having movement, i.e., a movie image having an impressive video effect, can be created easily by using the movie image file recorded on recording medium 18, and can also be reproduced.

Figure 18:
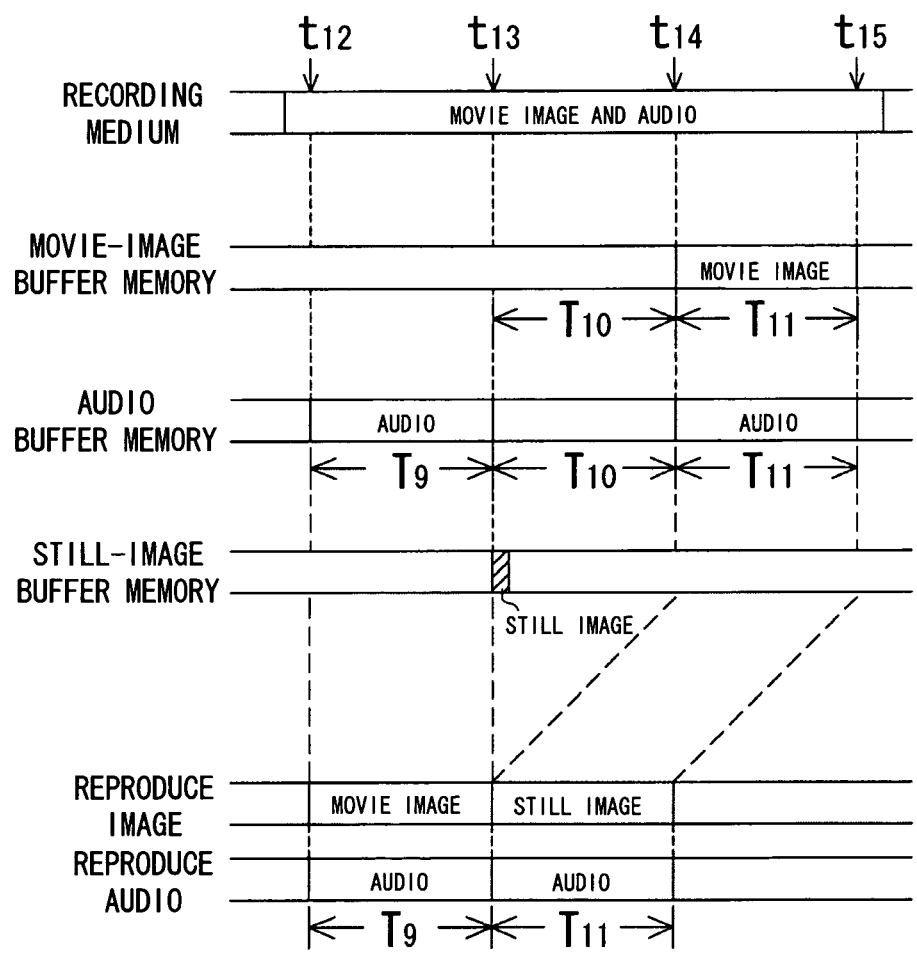
FIG. 18 is a time chart explaining processing when reproducing another "scenario movie image from still to moving".

It is to be noted that in the third embodiment, the movie image data of the movie image created during the period from immediately before pressing the shutter button until before the first predetermined time T5, or of the movie image created during the period from immediately after pressing the shutter button until after the third predetermined time T8 is stored in the movie-image buffer memory 12. However, as shown in FIG. 18, the constitution may be such that instead of storing the movie image data from immediately after pressing the shutter button (time t13), the movie image data of the movie image created during the period from time t14 (from time t13 until after a fixed time T10) until the third predetermined time T11 is stored in the movie-image buffer memory 12. That is, instead of using the frame image when the shutter button is pressed (time t13) or the frame image immediately thereafter, the movie image data of the movie image in which the frame image at time t14 is used as the first frame image is stored in the movie-image buffer memory 12.

In this case, the audio data during the period from the time when the shutter button is pressed by the user (time t13) until before the second predetermined time T9 is stored in the audio buffer memory 16; the image data of the frame image when the shutter button is pressed by the user (time t13) is stored, as the still image data, in the still-image buffer memory 14; the movie image data and audio data during the period from the time when the shutter button is pressed again by the user (time t14) until after the third predetermined time T11 are stored respectively in the movie-image buffer memory 12 and audio buffer memory 16.

Then, when reproducing the image, as shown in FIG. 18, first, the still image (frame image at time t13) stored in the still-image buffer memory 14 is displayed continuously on the display unit 20 during the second predetermined time T9, and then after the lapse of the second predetermined time T9, the frame images stored in the movie-image buffer memory 12 are displayed sequentially on the display unit 20 during the third predetermined time T11. Then, when reproducing the audio, as shown in FIG. 18, the audio from time t12 to time t13 stored in the audio buffer memory 16 is output sequentially to the speaker 22 during the second predetermined time T9, and the audio from time t14 to time t15 stored in the audio buffer memory 16 is output sequentially to the speaker 22 during the third predetermined time T11.

In FIG. 18, the "scenario movie image from still to moving" has been explained, but in the "scenario movie image from moving to still", the movie image data of the movie image created during the period from the time the shutter button is pressed until the first predetermined time is stored in the movie-image buffer memory 12; the image data of the frame images when the predetermined time elapses from after the lapse of the first predetermined time (when the shutter button is pressed again) is stored, as the still image data, in the still-image buffer memory 14; and the audio data of the audio during the period from the time the shutter button is pressed until the first predetermined time, and from the time the shutter button is pressed again until after the lapse of the second predetermined time is stored in the audio buffer memory 16. That is, instead of using the frame images when the shutter button is pressed again or the frame image immediately therebefore, the movie image data of the movie image in which the frame images when the first predetermined time elapses from the time the shutter button are pressed for the first time is used as the last frame image is stored in the movie-image buffer memory 12.

Then, when reproducing the image, first, the frame images stored in the movie-image buffer memory 12 are displayed sequentially on the display unit 20 during the first predetermined time, and then after the lapse of the first predetermined time, the still image stored in the still-image buffer memory 14 is displayed continuously on the display unit 20 during the second predetermined time. When reproducing the audio, the audio corresponding to each predetermined time stored in the audio buffer memory 16 is output sequentially to the speaker 22 during the first predetermined time and during the second predetermined time.

Further, in the third embodiment, the first predetermined time, the second predetermined time, and the third predetermined time are set based upon the movement velocity of the subject, however, for example, a table for the length of the first predetermined time corresponding to the movement velocity of the subject may be stored in a memory, or the like (not shown), and the first predetermined time may be set based upon this table. Moreover, the length of the reproducing time of the "scenario movie image from moving to still" (first predetermined time T5+second predetermined time T6), and length of the reproducing time of the "scenario movie image from still to moving" (second predetermined time T7+third predetermined time T8) may be set in advance, and the ratio of the first predetermined time T5 to the second predetermined time T6, or the ratio of the second predetermined time T7 to the third predetermined time T8 may also be set based upon the movement velocity of the subject.

Also, the constitution may be such that the menu item for setting the first predetermined time and the like is added to the menu, the menu screen is displayed on the display unit 20, and the first predetermined time or the like is set in advance by way of operations using the cross key. Moreover, the constitution may be such that either one of the first predetermined time T5 or the second predetermined time T6, or either one of the second predetermined time T7 or the third predetermined time T8 is set based upon the movement velocity of the subject, and the other is set in advance arbitrarily.

In the third embodiment, one frame of image data is stored, as the still image data, in the still-image buffer memory 14, however, the constitution may be such that a plurality of frames of image data shot in continuation are stored, as the still image data, in the still-image buffer memory 14.

In the third embodiment, either the "scenario movie image from moving to still" or the "scenario movie image from still to moving" is created and reproduced, however, a "scenario movie image of moving, still, and moving" or a "scenario movie image of still, moving, and still" or the like created by combining the "scenario movie image from moving to still" and the "scenario movie image from still to moving" may be created and reproduced.

Furthermore, in the third embodiment, description has been given using the example of the electronic camera 2 as the image processing device, but the present invention is not limited to electronic cameras, and can also be applied to other image processing devices, such as personal computers, which are capable of performing image processing on movie images shot by an imaging device or the like. Furthermore, in the third embodiment, a scenario movie image is created and reproduced using a movie image that is shot with the electronic camera 2 and recorded on the recording medium 18, but a scenario movie image can also be created and reproduced by the electronic camera 2 using a movie image shot by another imaging device or the like and recorded on a recording medium.

The embodiments explained above have been described so that the present invention is understood more easily, and are not intended to limit the present invention. Therefore, in this meaning, the respective elements, which are disclosed in the respective embodiments described above, also include all of modifications of design and equivalents belonging to the technical scope of the present invention.

The invention claimed is:

1. An imaging device, comprising:
an imaging sensor that captures light from a subject;
a first instruction unit that instructs to capture a still image by using the imaging sensor;
a recording control unit that records a single movie image file containing a first movie image produced based upon an imaging signal output from the imaging sensor during a period from when the still image is captured by the capturing instruction by the first instruction unit until before a first predetermined time and a second movie image produced by using the still image during a period from when the still image is captured until after a second predetermined time, or recording a single movie image file containing the second movie image and a third movie image produced based upon the imaging signal output from the imaging sensor during a period from when the still image is captured until after a third predetermined time, in a recording unit; and
a detection unit that detects movement information of the subject, wherein
the recording control unit sets at least one length of the first predetermined time, the second predetermined time, and the third predetermined time, based upon the movement information detected by the detection unit.

2. The imaging device according to claim 1, comprising
a display control unit that controls a display of a through image that is based upon the imaging signal output from the imaging sensor or the image recorded in the recording unit, on a display unit, wherein
when the movie image file containing the first movie image and the second movie image is recorded, the display control unit displays the through image during a period until capturing the still image, the still image during a period from when the still image is captured until after the second predetermined time, and the through image after a lapse of the second predetermined time, on the display unit.

3. The imaging device according to claim 1, comprising
a display control unit that controls a display of a through image that is based upon the imaging signal output from the imaging sensor or the image recorded in the recording unit, on a display unit, wherein
when the movie image file containing the second movie image and the third movie image is recorded, the display control unit displays the through image during a period until capturing the still image, the still image during a period from when the still image is captured until after the second predetermined time, the third movie image during a period from after a lapse of the second predetermined time until after the third predetermined time, and the through image after a lapse of the third predetermined time, on the display unit.

4. The imaging device according to claim 1, wherein the recording control unit further records a single movie image file containing the first movie image, the second movie image, and the third movie image.

5. The imaging device according to claim 1, wherein before recording the movie image file, the recording control unit sets at least one length of the first predetermined time, the second predetermined time, and the third predetermined time to an arbitrary length.

6. The imaging device according to claim 1, wherein the recording control unit records the movie image file containing the first movie image and the second movie image by adding audio corresponding to the second movie image to the movie image file, the audio being obtained during a period from when the still image is captured until after the second predetermined time.

7. The imaging device according to claim 1, comprising
a second instruction unit that instructs a time point from when the still image is captured until before a fourth predetermined time, wherein
the recording control unit records the movie image file containing the second movie image and the third movie image by adding audio corresponding to the second movie image to the movie image file, the audio being obtained during a period from when the still image is captured until before the fourth predetermined time.

8. The imaging device according to claim 1, comprising:
a selection unit that selects predetermined frame images from among a plurality of frame images forming a predetermined movie image file recorded on a recording medium; and
a display control unit that controls a display of a movie image formed by a fifth movie image produced by using the frame images recorded during a fifth predetermined time before a recording time of the predetermined frame image selected by the selection unit and a sixth movie image produced by using the predetermined frame images in a length of a sixth predetermined time, or a movie image formed by the sixth movie image and a seventh movie image produced by using the frame image recorded during a seventh predetermined time after the recording time of the predetermined frame images, on the display unit, wherein
the detection unit detects movement information of a subject in the plurality of frame images, and
the display control unit sets at least one length of the fifth predetermined time, the sixth predetermined time, and the seventh predetermined time, based upon the movement information detected by the detection unit.

9. An image processing device, comprising:
a first selection unit that selects predetermined frame images from among a plurality of frame images forming a predetermined movie image file recorded on a recording medium;
a display control unit that controls a display of a movie image formed by a first movie image produced by using the frame images recorded during a first predetermined time before a recording time of the predetermined frame images selected by the first selection unit and a second movie image produced by using the predetermined frame images in a length of a second predetermined time, or a movie image formed by the second movie image and a third movie image produced by using the frame images recorded during a third predetermined time after the recording time of the predetermined frame images, on the display unit; and
a detection unit that detects movement information of a subject in the plurality of frame images, wherein
the display control unit sets at least one length of the first predetermined time, the second predetermined time, and the third predetermined time, based upon the movement information detected by the detection unit.

10. The image processing device according to claim 9, wherein the display control unit displays, as a single movie image, the first movie image, the second movie image, and the third movie image, on the display unit.

11. The image processing device according to claim 9, wherein before displaying the movie image on the display unit, the display control unit sets at least one length of the first predetermined time, the second predetermined time, and the third predetermined time to an arbitrary length.

12. The image processing device according to claim 9, wherein
the first movie image is produced by the frame images recorded during a period from immediately before a recording time of the predetermined frame images until before the first predetermined time, and
the third movie image is produced by the frame images recorded during a period from immediately after the recording time of the predetermined frame images until after the third predetermined time.

13. The image processing device according to claim 9, comprising
a second selection unit that selects a second predetermined frame image different from the predetermined frame images, from among the plurality of frame images forming the predetermined movie image file, wherein
when the recording time of the second predetermined frame image selected by the second selection unit is before the recording time of the predetermined frame images, the display control unit uses the second predetermined frame image as an initial frame image forming the first movie image, and
when the recording time of the second predetermined frame image is after the recording time of the predetermined frame images, the display control unit uses the second predetermined frame image as an initial frame image forming the third movie image.

14. The image processing device according to claim 9, comprising
a reproduction control unit that controls reproduction of the audio added to the predetermined movie image file, to a reproduction unit, wherein
when the display control unit displays a movie image containing the first movie image and the second movie image on the display unit, the reproduction control unit reproduces the audio corresponding to the first movie image and the audio, which is the audio corresponding to the second movie image, during a period from the recording time of the predetermined frame images until after the second predetermined time, in the reproduction unit.

15. The image processing device according to claim 9, comprising
a reproduction control unit that controls reproduction of the audio added to the predetermined movie image file, to a reproduction unit, wherein
when the display control unit displays a movie image containing the second movie image and the third movie image on the display unit, the reproduction control unit reproduces the audio, which is the audio corresponding to the second movie image, during a period from the recording time of the predetermined frame images until before the second predetermined time, and the audio corresponding to the third movie image, in the reproduction unit.

* * * * *